United States Patent
Muraoka

(10) Patent No.: US 8,132,796 B2
(45) Date of Patent: *Mar. 13, 2012

(54) FLUID FILLED TYPE VIBRATION DAMPING DEVICE

(75) Inventor: Mutsumi Muraoka, Nagakute-tyo (JP)

(73) Assignee: Tokai Rubber Industries, Ltd., Komaki-shi (JP)

( * ) Notice: Subject to any disclaimer, the term of this patent is extended or adjusted under 35 U.S.C. 154(b) by 995 days.

This patent is subject to a terminal disclaimer.

(21) Appl. No.: 11/878,464

(22) Filed: Jul. 24, 2007

(65) Prior Publication Data

US 2008/0023897 A1    Jan. 31, 2008

(30) Foreign Application Priority Data

Jul. 26, 2006    (JP) .................................. 2006-203668

(51) Int. Cl.
*F16F 13/00* (2006.01)
(52) U.S. Cl. .............................. 267/140.14; 267/140.15
(58) Field of Classification Search ............. 267/140.13, 267/140.14, 140.15
See application file for complete search history.

(56) References Cited

U.S. PATENT DOCUMENTS

| | | | |
|---|---|---|---|
| 6,082,718 A | 7/2000 | Yamada et al. | |
| 6,176,477 B1 * | 1/2001 | Takeo et al. | 267/140.11 |
| 6,491,290 B2 * | 12/2002 | Muramatsu et al. | 267/140.14 |
| 6,659,436 B2 * | 12/2003 | Muramatsu et al. | 267/140.13 |
| 6,698,732 B2 * | 3/2004 | Takashima et al. | 267/140.13 |
| 7,350,776 B2 * | 4/2008 | Muramatsu et al. | 267/140.14 |
| 2003/0047855 A1 | 3/2003 | Takashima et al. | |
| 2005/0127586 A1 * | 6/2005 | Maeno et al. | 267/140.13 |

FOREIGN PATENT DOCUMENTS

| | | |
|---|---|---|
| JP | A-05-18433 | 1/1993 |
| JP | A-05-27380 | 4/1993 |
| JP | U-05-27380 | 4/1993 |
| JP | A-08-210430 | 8/1996 |
| JP | A-10-274279 | 10/1998 |
| JP | A-11-101297 | 4/1999 |
| JP | A-11-173372 | 6/1999 |
| JP | A-11-247918 | 9/1999 |
| JP | A-2002-295571 | 10/2002 |
| WO | WO 02/16798 A1 | 2/2002 |

OTHER PUBLICATIONS

Apr. 4, 2011 Office Action in related Application No. 2006-203668 w/partial translation.

* cited by examiner

*Primary Examiner* — Bradley King
*Assistant Examiner* — Nicholas J Lane
(74) *Attorney, Agent, or Firm* — Oliff & Berridge, PLC

(57) ABSTRACT

A fluid filled type vibration damping device wherein an elastic rubber film is disposed to partially define a primary fluid chamber disposed on one side thereof, and a pressure operating chamber is disposed on an opposite side from the primary fluid chamber with the elastic rubber film interposed therebetween. The elastic rubber film has a dome shape and an attraction face of the pressure operating chamber has an inverted dome shape, and has a negative pressure suction groove including an outer circumferential groove extending in a circumferential direction at an outer peripheral portion of the attraction face and opening to the pressure operating chamber, and a negative pressure suction bore for introducing a negative pressure to the pressure operating chamber is connected to the negative pressure suction groove.

5 Claims, 9 Drawing Sheets

FLUID FILLED TYPE VIBRATION DAMPING DEVICE

INCORPORATED BY REFERENCE

The disclosure of Japanese Patent Application No. 2006-203668 filed on Jul. 26, 2006 including the specification, drawings and abstract is incorporated herein by reference in its entirety.

BACKGROUND OF THE INVENTION

1. Field of the Invention

The present invention relates generally to a fluid filled type vibration damping device capable of providing vibration damping effect based on the flow action of a fluid sealed therein, and more particularly to a fluid filled type vibration damping device having an elastic rubber film disposed within a fluid chamber sealed with the fluid, and capable of changing its damping properties by changing the state of the elastic rubber film.

2. Description of the Related Art

Fluid filled type vibration damping devices designed to produce vibration damping effect on the basis of resonance action or other fluid action of a fluid sealed in the interior are known as one type of vibration damping device such as a vibration damped coupling or vibration damped support designed for installation between components making up a vibration transmission system. In such a fluid filled type vibration damping device, typically, a first metal mounting member is disposed on the side of a first opening of a second metal mounting member of tubular shape, the first mounting member and the second mounting member are elastically connected by a main rubber elastic body with one opening of the second mounting member being sealed off fluid-tightly, while the other opening of the second mounting member is sealed off fluid-tightly by a flexible film, thereby forming between the main rubber elastic body and the flexible film a fluid chamber in which a non-compressible fluid is sealed. A partition member supported by the second mounting member is disposed between the main rubber elastic body and the flexible film, thereby dividing the fluid chamber to form to either side of the partition member a pressure-receiving chamber whose wall is partially constituted by the main rubber elastic body and an equilibrium chamber whose wall is partially constituted by the flexible film, with the two chambers communicating with each other through an orifice passage.

Such a fluid filled type vibration damping device is able to exhibit excellent vibration damping effect with respect to low frequency vibration, such as engine shake, by means of flow action of the non-compressible fluid through the orifice passage.

However, although this type of fluid filled vibration damping device is able to exhibit excellent vibration damping effect with respect to the predetermined frequency range to which the orifice passage is tuned, like engine shake, it was difficult for this type of vibration damping device to exhibit sufficient damping effect with respect to vibration such as idling vibration or booming noise, in a frequency range higher than the tuning frequency of the orifice passage, since the orifice passage is held in substantially closed state upon input of these high frequency vibration, whereby a dynamic spring constant of the device will become higher.

To cope with this problem, an improved fluid-filled type vibration damping device was disclosed in U.S. Pat. No. 6,082,718, wherein a deformable elastic rubber film is disposed such that on one side of the elastic rubber film, there is formed a primary fluid chamber whose wall is partially defined by a first surface of the elastic rubber film, and on the other side of the elastic rubber film, there is formed a pressure operating chamber. The other surface of the elastic rubber film faces to the pressure operating chamber, and a pressure in the pressure operating chamber is controlled from the outside. This makes it possible to change vibration damping characteristics of the device.

In the fluid filled type vibration damping device disclosed in U.S. Pat. No. 6,082,718, upon input of vibration having the same frequency to which the orifice passage is tuned, a negative pressure is applied to the pressure operating chamber in order to attract the elastic rubber film to an attraction face of the pressure operating chamber, thereby limiting deformation of the elastic rubber film. With this arrangement, a sufficient amount of fluid flowing through the orifice passage is obtained, whereby the vibration damping device is able to exhibit high damping effect. On the other hand, upon input of vibration having a frequency higher than the tuning frequency of the orifice passage, the pressure operating chamber is held in the atmospheric pressure. With this arrangement, the elastic rubber film is allowed to deform, whereby pressure fluctuation in the primary fluid chamber due to the input of vibration can be absorbed by means of deformation of the elastic rubber film.

In the fluid filled type vibration damping device disclosed in U.S. Pat. No. 6,082,718, it is desirable to stably and quickly change the vibration damping characteristics in order to ensure excellent vibration damping effect. More specifically, it is required to quickly change the operating state of the vibration damping device between one state where the deformation of the elastic rubber film is limited by applying negative pressure to the pressure operating chamber and the other state where the deformation of the elastic rubber film is permitted by keeping the pressure operating chamber in the atmospheric pressure.

However, in the vibration damping device of construction according to U.S. Pat. No. 6,082,718, a tiny gap is formed between elastic rubber film and the attraction face of the pressure operating chamber. Accordingly, even if the negative pressure is applied to the pressure operating chamber, the deformation of the elastic rubber film is permitted at the portion where the tiny gap is formed. With this drawback, the pressure fluctuation generated in the primary fluid chamber is absorbed by means of deformation of the elastic rubber film. It may be difficult for the disclosed vibration damping device to obtain sufficient amount of fluid flowing through the orifice passage. Thus, the vibration damping device is less likely to exhibit sufficient vibration damping effect.

In addition, the elastic rubber film is retracted first at a portion located close to a negative pressure suction hole. This portion of the elastic rubber film is likely to fully close the negative pressure suction hole at the earlier stage of the negative pressure applying operation. As a result, the attraction of the elastic rubber film is not sufficiently completed, so that a large air trapped may be formed between the elastic rubber film and the attraction face. This trapped air will permit the deformation of the elastic rubber film, like the above described tiny gap, the desired high vibration damping effect might not be exhibited sufficiently.

As will be understood from the foregoing description, the fluid-filled vibration damping device disclosed in U.S. Pat. No. 6,082,718 is disable to stably switch the absorption state and non-absorption state of the elastic rubber film, since the deformation of the elastic rubber film is not stable. Therefore, it is difficult for the disclosed vibration damping device to switch its vibration damping properties quickly and stably.

SUMMARY OF THE INVENTION

It is therefore one object of this invention to provide a fluid filled type vibration damping device of novel construction capable of changing its damping characteristics quickly and stably.

The above and/or optional objects of this invention may be attained according to at least one of the following modes of the invention. The following modes and/or elements employed in each mode of the invention may be adopted at any possible optional combinations. It is to be understood that the principle of the invention is not limited to these modes of the invention and combinations of the technical features, but may otherwise be recognized based on the teachings of the present invention disclosed in the entire specification and drawings or that may be recognized by those skilled in the art in the light of the present disclosure in its entirety.

A first mode of the invention provides a fluid filled type vibration damping device including: a first mounting member; a second mounting member of tubular shape, the first mounting member being disposed on a side of one opening of the second mounting member; a main rubber elastic body elastically connecting the first mounting member and the second mounting member; a flexible film by which an other opening of the second mounting member is sealed off fluid-tightly, thereby forming between opposing faces of the main rubber elastic body and the flexible film a fluid chamber in which a non-compressible fluid is sealed; a partition member supported by the second mounting member, with the fluid chamber divided by the partition member into a primary fluid chamber whose wall is partially defined by the main rubber elastic body and an auxiliary fluid chamber whose wall is partially defined by the flexible film, and with an orifice passage connecting the primary fluid chamber and the auxiliary fluid chamber being formed; an elastic rubber film being disposed to partially define the primary fluid chamber disposed on one side thereof; and a pressure operating chamber having an attraction face being disposed on an opposite side from the primary fluid chamber with the elastic rubber film interposed therebetween, the pressure operating chamber being arranged to be applied with a negative pressure in order to deform and attract the elastic rubber film onto the attraction face of the pressure operating chamber, wherein the elastic rubber film has a dome shape being convex with respect to a primary fluid chamber side, and the attraction face of the pressure operating chamber has an inverted dome shape being concave with respect to the primary fluid chamber side, wherein the attraction face is formed with a negative pressure suction groove including an outer circumferential groove extending in a circumferential direction at an outer peripheral portion of the attraction face and opening to the pressure operating chamber, and wherein a negative pressure suction bore for introducing the negative pressure to the pressure operating chamber is connected to the negative pressure suction groove.

According to the fluid-filled type vibration damping device of construction of this mode, the elastic rubber film is of a dome shape which projects toward the primary fluid chamber, and the attraction face is of an inverted dome shape or round concave shape which retract from the primary fluid chamber. With this arrangement, when a negative suction force is applied to the elastic rubber film, the elastic rubber film is able to be deformed into a shape concave with respect to the primary fluid chamber side. As a result, the shape of the elastic rubber film can be clearly changed at the negative pressure suction state and the non-suction state, whereby the vibration damping device is able to change its damping characteristics surely. In addition, the elastic rubber film, when being rendered in deformation projecting toward the pressure operating chamber, will be attracted onto the attraction face so as to along with the surface of the attraction face. Therefore, the elastic rubber film can be held in a bonding state with stability. On the other hand, when the negative pressure suction is released, the elastic rubber film can be quickly recovered by mainly utilizing its restoring force to its original shape which is convex toward the primary fluid chamber. As a result, the present fluid filled vibration damping device is able to change its vibration damping characteristics quickly and stably.

In the elastic rubber film having a generally dome shape, the projecting top end or the central portion of the elastic rubber film will undergo a relatively large amount of deformation, so that it is readily attracted onto the attraction face of the pressure operating chamber. On the other hand, the outer peripheral portion of the elastic rubber film will undergo a relatively small amount of deformation, so that it may be spaced away from the attraction face. It is needed to avoid a formation of the gap between the elastic rubber film and the attraction face in order to permit a freely elastic deformation of the elastic rubber film at the portion facing the gap, since this elastic deformation of the elastic rubber film will absorb pressure fluctuation in the primary fluid chamber, and accordingly causes an insufficient amount of fluid flowing through the orifice passage, to thereby make it difficult to stably change the vibration damping characteristics.

In view of the above described matters, the negative pressure suction groove is employed in the present invention, wherein the outer circumferential groove is formed on the attraction face so as to extending circumferentially and open in the outer peripheral portion of the attraction face. This arrangement makes it possible to apply the negative pressure suction force to the outer peripheral portion of the elastic rubber film. As a result, the outer peripheral portion of the elastic rubber film, which is likely to be spaced away from the attraction face, can be surely attracted onto the attraction face, making it possible to minimize the slight gap formed between the elastic rubber film and the attraction face. Accordingly, when the negative pressure is applied to the pressure operation chamber, the elastic rubber film is quickly deformed to realize its non-deformable state. Thus, the sufficient amount of fluid flowing through the orifice passage is effectively obtained, making it possible for the vibration damping device to change its damping characteristics with stability.

A second mode of the invention provides the fluid filled type vibration damping device according to the first mode, wherein the negative pressure suction bore is open in the outer circumferential groove. With this arrangement, the negative pressure suction force applied through the negative pressure suction bore is directly transmitted to the outer circumferential groove, so that the strong suction force can be applied to the elastic rubber film. Furthermore, in the case where the negative pressure suction bore is formed at the outer peripheral portion of the attraction face, i.e., the outer peripheral portion of the partition member, it is possible to effectively obtain the volume of the auxiliary fluid chamber that is formed on the side opposite from the pressure operating chamber with the partition member interposed therebetween.

A third mode of the invention provides the fluid filled type vibration damping device according to the first or second mode, wherein the negative pressure suction groove further includes a diametric groove extending a diametric direction of the attraction face and opening to the pressure operating chamber, while connecting to the circumferential groove. With this arrangement, the negative pressure suction force can be applied to the central portion of the elastic rubber film in addition to the outer peripheral portion, whereby the elastic rubber film can be attracted to the attraction face so quickly and stably.

A fourth mode of the invention provides the fluid filled type vibration damping device according to the third mode, wherein the negative pressure suction bore is open in a connecting point between the circumferential groove and the diametric groove. With this arrangement, the negative pressure suction force applied from the negative pressure suction bore can be effectively transmitted to both of the circumferential groove and the diametric groove.

A fifth mode of the invention provides the fluid filled type vibration damping device according to the third mode, wherein the negative pressure suction bore is open in a central portion of the diametric groove in a longitudinal direction thereof. With this arrangement, the negative pressure suction force applied from the negative pressure suction bore can be generally evenly applied to the diametric groove in opposite diametric directions, and the strong suction force can be applied to the central portion of the elastic rubber film. As a result, the elastic rubber film can be attracted to the attraction face with high stability.

A sixth mode of the invention provides the fluid filled type vibration damping device according to any one of the first through fifth modes, wherein the negative pressure suction groove has a depthwise dimension that gradually increases as it goes toward the negative pressure suction bore. This arrangement is effective to avoid a clog of the negative pressure suction bore with the elastic rubber film before the entire elastic rubber film is attracted onto the attraction face due to that a part of the elastic rubber film near to the negative pressure suction bore is first attracted to the attraction face as a result of rapid application of the negative pressure suction force at the negative pressure suction bore. This makes it possible to eliminate or reduce the possibility of the formation of the gap between the elastic rubber film and the attraction face, so that the elastic rubber film can be entirely attracted to the attraction force with stability.

A seventh mode of the invention provides the fluid filled type vibration damping device according to any one of the first through sixth modes, wherein the elastic rubber film includes a plurality of thick walled reinforcing ribs each extending radially from an outer peripheral portion of the elastic rubber film with a radial length not enough to reach a central portion of the elastic rubber film, while being disposed so as to spaced away from one another in the circumferential direction so that thin walled portions of thin rubber elastic body are formed between circumferentially adjacent ones of the reinforcing ribs, and a central curved portion having a wall thickness thinner than the reinforcing ribs with a inverted dome shape projecting toward the pressure operating chamber is formed in the central portion of the elastic rubber film which is surrounded by radially inner ends of the plurality of the reinforcing ribs.

With this arrangement, when the negative pressure is not applied to the pressure operating chamber, fluid pressure absorption effect can be provided by means of the elastic deformation of the thick walled portion and the central curved portion, which are formed with a thin thickness. On the other hand, when the negative pressure is applied to the pressure operating chamber, the presence of the reinforcing ribs will prevent excessive attraction of the thin walled portion and the central curved portion into the negative pressure suction groove. Thus, possible damages to the elastic rubber film can be effectively avoided.

Furthermore, since the central curved portion has an inverted dome shape projecting toward the pressure operating chamber, when the negative pressure is applied to the pressure operating chamber, the central curved portion can be quickly elastically deformed. In accordance with the elastic deformation of the central curved portion of the elastic rubber film, the inner end portions of the reinforcing ribs can be attracted to the pressure operating chamber side, whereby the reinforcing ribs can undergo elastic deformation sufficiently. On the other hand, once the negative pressure is released from the pressure operating chamber, the elastic rubber film can be rapidly restored in its original shape or position, owing to the restoring force of the reinforcing ribs having a relatively large thickness.

An eighth mode of the invention provides the fluid filled type vibration damping device according to any one of the first through seventh modes, wherein the partition member includes a first partition component and a second partition component; the primary fluid chamber and the auxiliary fluid chamber are disposed on opposite sides of the first partition component interposed therebetween; the second partition component divides the primary fluid chamber into a pressure receiving chamber whose wall is partially defined by the main rubber elastic body and generates fluid pressure fluctuation upon input of vibration; an intermediate chamber whose wall is partially defined by the elastic rubber film, while the auxiliary fluid chamber function as an equilibrium chamber whose wall is partially defined by the flexible film to readily permit volumetric change thereof; and the orifice passage includes a first orifice passage connecting the pressure receiving chamber and the equilibrium chamber, and a second orifice passage connecting the intermediate chamber and the equilibrium chamber.

With this arrangement, the first orifice passage may be tuned to a higher frequency range than the second orifice passage, for example, whereby the present vibration damping device can exhibit a variety of input vibrations in a plurality of or a wide frequency range by means of flow action of the fluid through the orifice passages tuned to different frequency ranges.

A ninth mode of the invention provides the fluid filled type vibration damping device according to the eighth mode, wherein the second partition component includes a movable member whose displacement or deformation is limited, and the movable member faces at both sides thereof to the pressure receiving chamber and the intermediate chamber so that the pressure fluctuation is generated in the pressure receiving chamber due to the elastic deformation of the main rubber elastic body, and the pressure fluctuation in the pressure receiving chamber is transmitted to the intermediate chamber via the movable member.

With this arrangement, upon input of high frequency and small amplitude vibrations such as booming noise, the pressure fluctuation generated in the pressure receiving chamber can be absorbed by means of displacement or deformation of the movable member, whereby the present vibration damping device is able to exhibit excellent damping effect with respect to high frequency and small amplitude vibrations. On the other hand, upon input of low frequency and large amplitude vibrations, like engine shakes, the displacement or the deformation of the movable plate is limited, whereby the pressure fluctuation is not absorbed by the movable member, and a sufficient amount of fluid flowing through the first orifice passage can be obtained. Therefore, the present vibration damping device is capable of exhibiting further excellent vibration damping performance over a wide frequency range.

BRIEF DESCRIPTION OF THE DRAWINGS

The foregoing and/or other objects features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Figure 1:
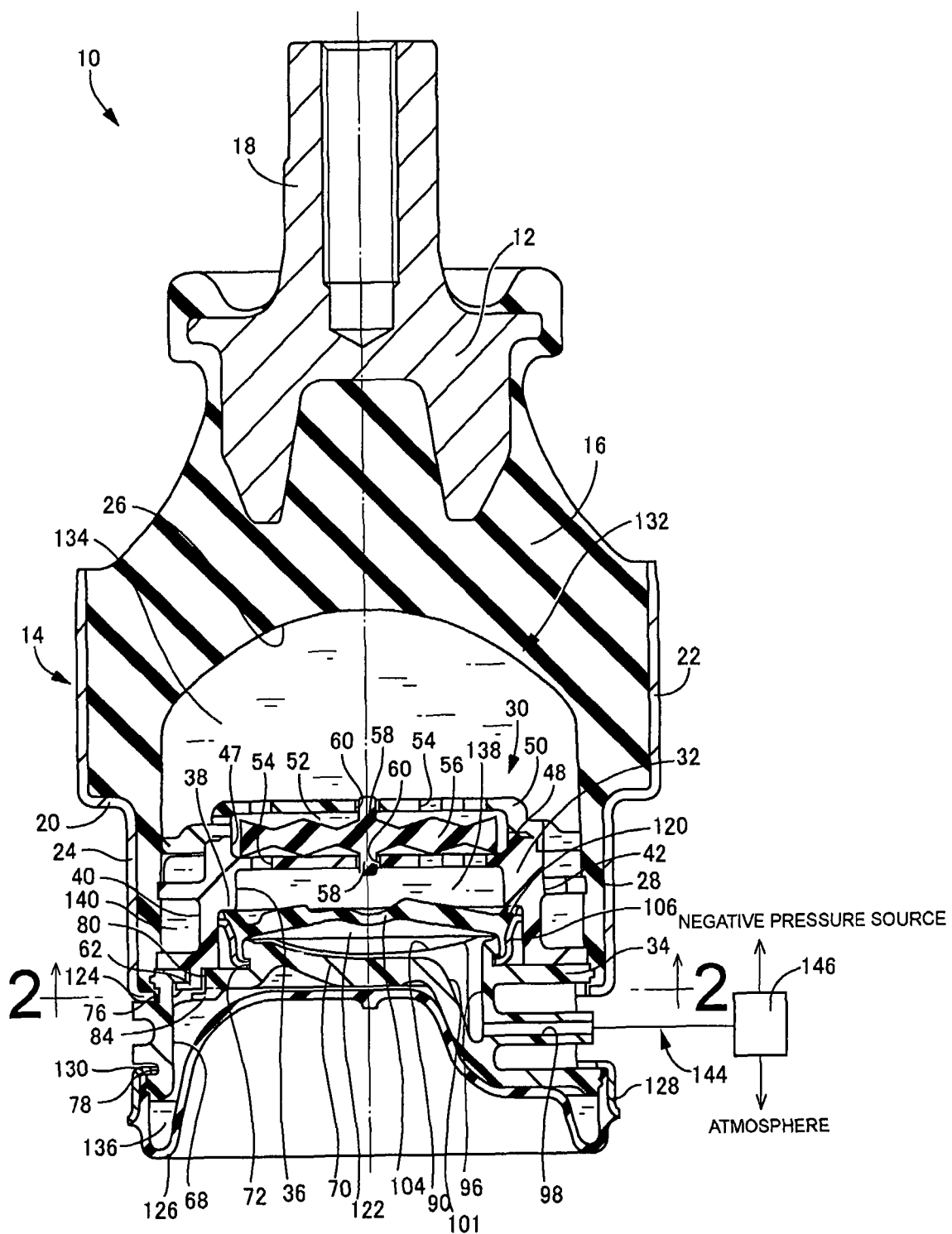
FIG. 1 is an elevational view in axial or vertical cross section of a fluid filled type vibration damping device in the form of an engine mount, which is constructed according to the first embodiment of the invention taken along line 1-1 of FIG. 2.
Figure 2:
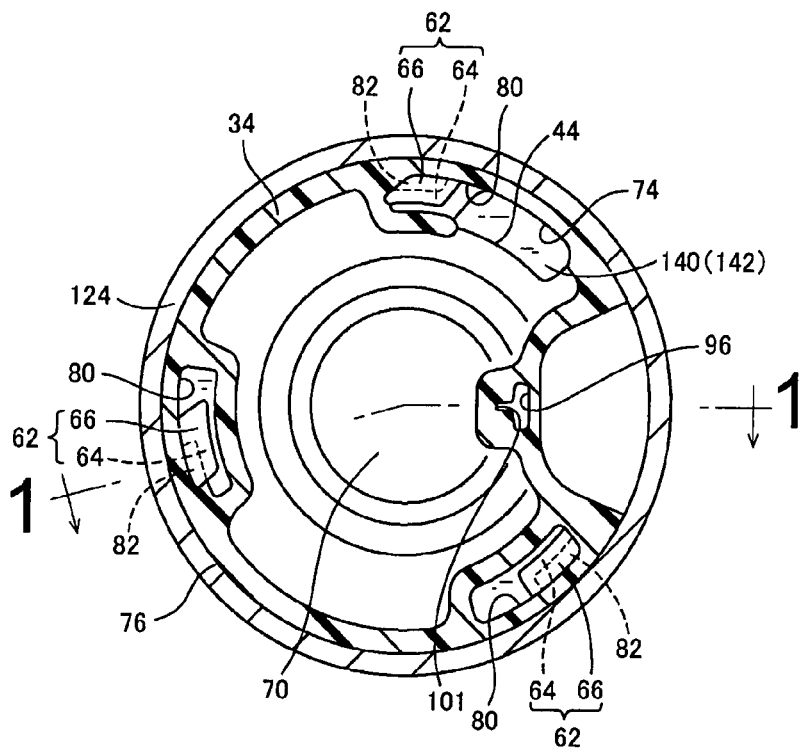
FIG. 2 is a cross sectional view taken along line 2-2 of FIG. 1.

Referring first to FIGS. 1 and 2, there is depicted a fluid filled type vibration damping device of an automotive engine mount 10 according to a first mode of the invention. This engine mount 10 includes a first mounting member 12 of metal, a second mounting member 14 of metal, and a main rubber elastic body 16 by which the first and second mounting members 12, 14 are elastically connected. By mounting the first mounting member 12 to a power unit side and mounting the second mounting member 14 to a body side of a vehicle, the power unit is supported in vibration-damping fashion on the vehicle body. In FIG. 1, the engine mount 10 is shown as it would appear when not installed in an automobile. In the illustrated state, the distributed support load of the power unit would be input in the axial direction of the mounting (the vertical in FIG. 1). Accordingly, with the engine mount 10 in the installed state, on the basis of elastic deformation of the main rubber elastic body 16, the first mounting member 12 and second mounting member 14 will undergo displacement in the direction moving closer together, with the principal direction of input of vibration to be damped generally coincident with the axial direction of the mount. In the description hereinbelow the vertical direction shall as general rule refer to the vertical direction in FIG. 1.

Described more specifically, the first mounting member 12 has a generally cup shape open at the bottom. In the center portion of the upper base of the first mounting member 12 is integrally formed a nut portion 18 projecting upward, furnished with a screw hole which opens upward.

The second mounting member 14, meanwhile, has a large-diameter, stepped round tubular shape, with the section thereof above a step portion 20 formed in the axially medial portion constituting a large-diameter tube portion 22 and the section below constituting a small-diameter tube portion 24 of smaller diameter dimension than the large-diameter tube portion 22. The first mounting member 12 is position spaced apart to one side (above in FIG. 1) of the second mounting member 14, with the center axes of the two members 12, 14 being positioned on approximately the same line, and with the main rubber elastic body 16 disposed between the first mounting member 12 and the second mounting member 14.

The main rubber elastic body 16 has a large-diameter, generally frustoconical shape, and at its small-diameter end face is bonded by vulcanization the first mounting member 12, which is embedded in it substantially entirely except for the nut portion 18. At the outer circumferential face of the large-diameter end of the main rubber elastic body 16 is bonded by vulcanization the inside peripheral face of the large-diameter tube portion 22 and step portion 20 of the second mounting member 14. That is, the main rubber elastic body 16 is constituted as an integrally vulcanization molded component with the first mounting member 12 and the second mounting member 14. With this arrangement, the first mounting member 12 and the second mounting member 14 are elastically connected together by means of the main rubber elastic body 16, with the opening at one side (the upper side in FIG. 1) of the large-diameter tube portion 22 of the second mounting member 14 sealed off fluid-tightly by the main rubber elastic body 16. A large-diameter recess 26 of generally conical shape opening downward is formed to the large-diameter end face of the main rubber elastic body 16. A thin seal rubber layer 28 integrally formed with the main rubber elastic body 16 is formed on the inside peripheral face of the small-diameter tube portion 24 of the second mounting member 14, so as to cover substantially the entirety thereof, at generally uniform thickness.

Figure 3:
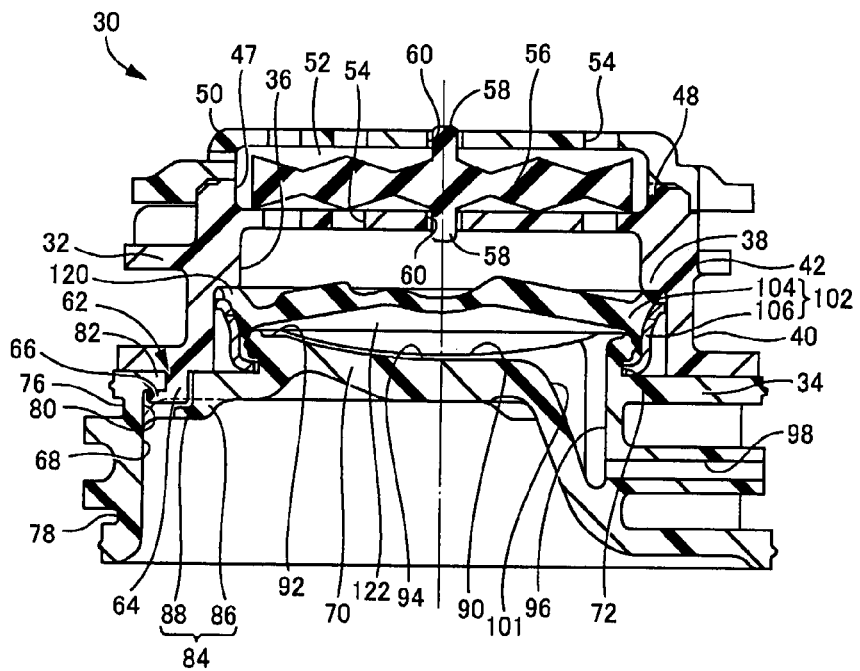
FIG. 3 is an elevational view in axial or vertical cross section of a partition member of the engine mount of FIG. 1.

The integrally vulcanization molded component of the main rubber elastic body 16 with the first mounting member 12 and the second mounting member 14 has a partition member 30 attached thereto from the opening on the other side (the small-diameter tube portion 24 side, namely, the lower side in FIG. 1) of the second mounting member 14. As shown in FIG. 3, the partition member 30 is of split construction composed of a plurality of members assembled together, and includes a upper partition member 32 and a lower partition member 34.

Figure 4:
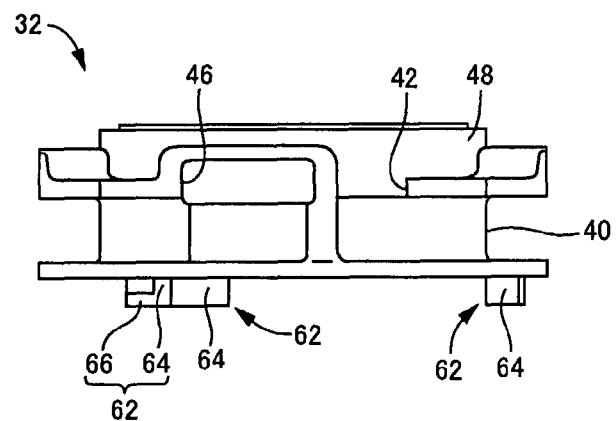
FIG. 4 is a side elevational view of an upper partition member 32 of the partition member of FIG. 1.
Figure 5:
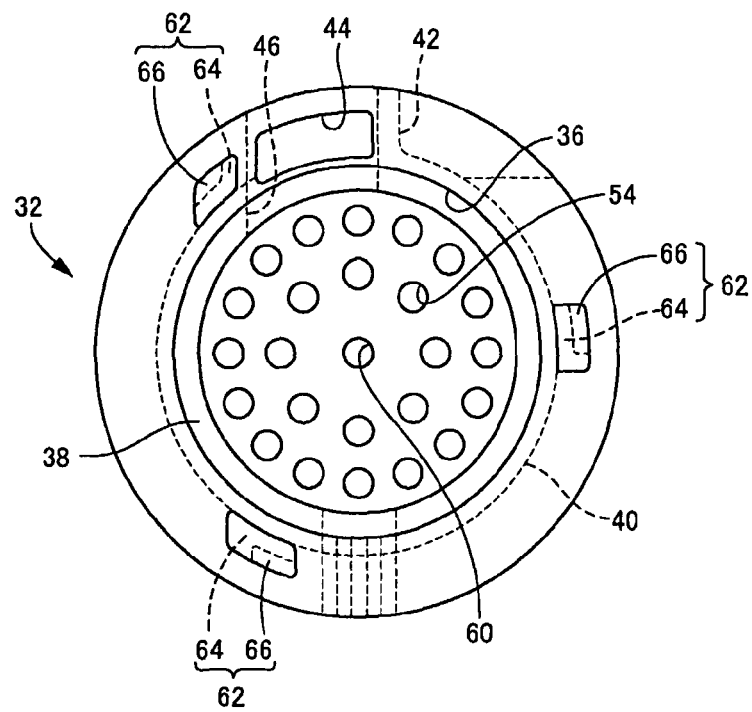
FIG. 5 is a bottom plane view of the upper partition member 32 of FIG. 1.

As shown in FIGS. 4 and 5, the upper partition member 32 has an inverted cup shape. The center top wall portion thereof which constitutes top wall portion has a thin, generally disk shape. In this embodiment, the upper partition member 32 is formed of a rigid synthetic resin material, and has an outside diameter dimension smaller than the inside diameter dimension of the small-diameter tube portion 24 of the second mounting member 14. The upper partition member 32 has a recess in the form of large-diameter central recess 36 opening onto the center of the lower face thereof. An inner circumferential surface of the peripheral wall of the central recess 36 includes an annular step portion 38 that is positioned in the medial portion in the axial direction (in the depth direction) of the central recess 36, while spreading outward in the axis-perpendicular direction. In other words, an inside diameter dimension of the central recess 36 is made smaller on the top wall side (a small diameter portion on the upper side in FIG. 1) of the step portion 38 rather than the opening side (a large diameter portion on the lower side in FIG. 1) of the step portion 38.

The peripheral wall of the upper partition member 32 is formed with a circumferential groove 40 open in its an outer circumferential surface and extending a predetermined length in the circumferential direction (in this embodiment, just short of its circumference). One circumferential end of the circumferential groove 40 opens upward through a communication window 42 of notch shape formed in the upper end of the upper partition member 32. The other circumferential end of the circumferential groove 40 opens downward through a communication hole 44 perforating the lower end of the upper partition member 32. The other circumferential end of the circumferential groove 40 further extends upward and communicating with the inner circumferential face of the peripheral wall of the central recess 36 through a communication passage 46 perforating the peripheral wall of the upper partition member 32.

On the upper face of the top wall of the upper partition member 32 is formed a shallow upper recess 47 opening upward. The upper recess 47 has an inside diameter dimension approximately the same as the inside diameter dimension of the top wall side (a small diameter portion on the upper side in FIG. 1) of the step portion 38 of the central recess 36. The peripheral wall of the upper recess 47 constitutes an annular projection 48 of annular shape projecting upward.

A cover member 50 is superposed from above against the top wall of the upper partition member 32, thereby covering the upper recess 47 of the upper partition member 32. The cover member 50 has a shallow, inverted bowl shape and is formed using a rigid material such as synthetic resin material. The cover member 50 is superposed on the upper face of the upper partition member 32 with the openings of their recesses being mutually aligned. Namely, distal end faces of the peripheral wall of the annular projection 48 of the upper partition member 32 and the peripheral wall of the cover member 50 are superposed on each other and fixed together by welding, bonding or the like. A bottom wall of the upper recess 47 of the upper partition member 32 and a top wall of the cover member 50 are both circular flat faces, and are vertically opposed to each other with a given spacing therebetween in a mutually parallel fashion. Thus, a hollow constrained installation zone 52 is formed between these opposed circular flat faces.

A plurality of through holes 54 of small holes are formed perforating in the thickness direction through both the upper and lower wall portions of the constrained installation zone 52 consisting of the bottom wall of the upper recess 47 of the upper partition member 32 and the top wall of the recess of the cover member 50. Via these through holes 54, the constrained installation zone 52 is communicating with axially upper and lower outside zones. That is, in this embodiment, these constrained installation zone 52 and through holes 54, 54 formed on the upper and lower wall portions cooperate together to constitute a fluid flow passage which enables a pressure-receiving chamber 134 described later to communicate with an intermediate chamber 138 described later.

A movable plate 56 serving as a movable member is positioned housed within the constrained installation zone 52. The movable plate 56 has a thin, generally circular disk shape and is formed of a rubber elastic material. In this embodiment in particular, a plurality of irregularities or a plurality of corrugations are furnished on both the upper and lower faces of the movable plate 56 respectively, so that it has a large undulating face that can be visually confirmed. The thickness dimension of the movable plate 56 is smaller than the distance between the opposed faces of the upper and lower wall portions of the constrained installation zone 52. The outside diameter dimension of the movable plate 56 is smaller than the inside dimension of the inside diameter of the constrained installation zone 52.

A pair of center axis portions 58, 58 projecting to either side in the axial direction are integrally formed on the center portion of the movable plate 56. Each center axis portion 58 fits displaceably inserted into a through hole 60 perforating the center axes of the upper partition member 32 and the cover member 50 respectively. By means of this design, the movable plate 56 is positioned in the approximate center of the constrained installation zone 52 so as to be capable of displacement in the axial direction in the constrained installation zone 52 by the distance equivalent to the difference between the thickness dimension of the movable plate 56 and the height dimension of the constrained installation zone 52. The extent of axial displacement of the movable plate 56 is limited by means of the movable plate 56 striking against the upper and lower inside face of the constrained installation zone 52. During this striking of the movable plate 56 against the upper and lower inside face of the constrained installation zone 52, cushioning function is exhibited based on elasticity of the movable plate 56 per se, thereby avoiding striking noise and shock.

An outside peripheral portion around the opening of the central recess 36 of the upper partition member 32 provides a lower end face of a planar face spreading in the axis-perpendicular direction, where mating projections 62 are integrally formed so as to project downward. In this embodiment in particular, three mating projections 62, 62, 62 are situated in the widthwise central portion of the lower end face of the upper partition member 32 at approximately equal intervals in the circumferential direction. Each mating projection 62 is composed of a leg portion 64 extending downward with a generally unchanging "L" shaped cross section from a basal end portion integrally formed with the lower end portion of the upper partition member 32, and a head portion 66 spreading with a generally flat plate profile in the axis-perpendicular direction of the upper partition member 32 from the distal end portion of the leg portion 64, while covering the distal end of the leg portion 64. With this arrangement, the axial cross section of the mating projection 62 has a key shape overall.

Figure 6:
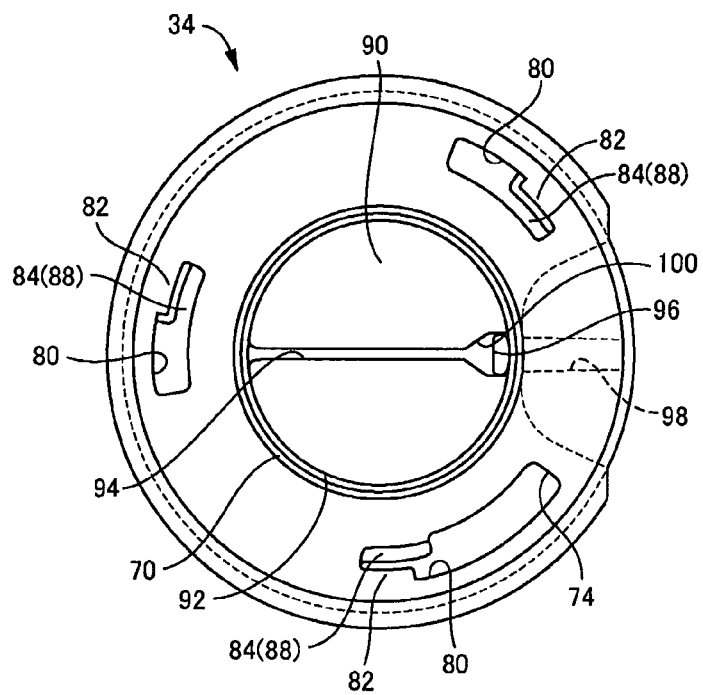
FIG. 6 is a top plane view of a lower partition member 34 of the partition member of FIG. 1.
Figure 7:
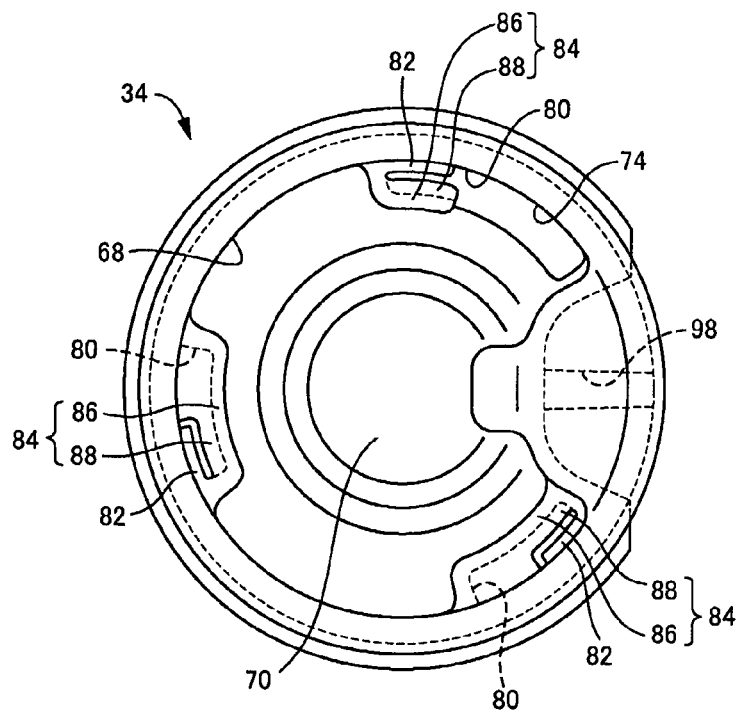
FIG. 7 is a bottom plane view of the lower partition member 34 of FIG. 1.

A lower partition member 34 is superposed and attached to the upper partition member 32 from axially below. As shown in FIGS. 6 and 7, the lower partition member 34 has a thick, generally circular disk shape with its outside diameter dimension approximately the same as that of the upper partition member 32 and is formed of a rigid synthetic resin material. The lower partition member 34 has a lower recess 68 opening onto the center of its lower face. The lower partition member 34 further includes a mating projection portion in the form of a center projection 70 of shallow bowl shape integrally formed at the center of its upper end face.

On an outer circumferential surface of the center projection 70, a fitting groove 72 is formed at its basal end portion so as to extend continuously over its entire circumference. In the outside peripheral portion of the lower partition member 34, a through hole 74 perforating in the axial direction is formed at the position corresponding to the opening of the communication hole 44 when the lower partition member 34 is superposed against the upper partition member 32. This through hole 74 is open to either side in the axial direction, respectively to the upper end face of the lower partition member 34 and the inner face of the lower recess 68.

On an outer circumferential surface of the lower partition member 34, an upper mating groove 76 of concave groove shape is formed circumferentially extending continuously over the entire circumference of the axial upper end. Likewise, at the axial lower end of the outer circumferential surface of the lower partition member 34, a lower mating groove 78 of concave groove shape is formed circumferentially extending continuously over the entire circumference.

On the radially outer side of the center projection 70 of the lower partition member 34, an annular upper end face extends in the radially outward direction. This annular upper end face is formed with engaging holes 80 at respective circumferential positions corresponding to the mating projections 62 superposed against the upper partition member 32. The engaging holes 80 perforate through the lower partition member 34 in the axial direction and open to the inner face of the lower recess 68. Each engaging hole 80 extends a predetermined length in the circumferential direction of the lower partition member 34. The shape and size of the engaging holes 80 are arranged so that each mating projection 62 can be inserted into the corresponding engaging hole 80 and can experience relative displacement at a prescribed amount in the circumferential direction.

At one circumferential end of the engaging hole 80 is integrally formed a projecting wall portion 82 that extends inward so as to partly project into the engaging hole 80. As will be described later, the mating projection 62 of the upper partition member 32 being inserted into the engaging hole 80 is circumferentially displaced relative to the outside projecting wall portion 82, thereby coming into engagement with the projecting wall portion 82.

Underneath each engaging hole 80 of the lower partition member 34, a cover member 84 is integrally formed so as to cover the opening of the engaging hole 80 from below. As shown in FIG. 3, the cover member 84 includes a vertical wall portion 86 of generally unchanging rectangular frame cross section extending downward from the rim of the opening of the engaging hole 80, and a lid wall portion 88 of generally flat plate shape bent in the diametrical direction of the lower partition member 34 from the distal edge portion of the vertical wall portion 86.

On the upper end face of the center projection 70, an attraction face 90 is formed having an inverted dome shape whose concave face is open in the axially upward direction of the lower partition member 34. The attraction face 90 is a generally circular shape in the top plane view and in this embodiment particularly, the attraction face 90 is a curvature face with a generally constant curvature over the entire face. On the outermost peripheral end of the attraction face 90, there is formed an outer circumferential groove 92 having a shape of an annular recess which opens upward and continues over the entire circumference. In this embodiment, a diametric groove 94 is continuously formed having a shape of recess groove extending in a diametric direction of the attraction face 90 and opening upward. The both ends in the longitudinal direction of the diametric groove 94 are connected with the outer circumferential groove 92. With this arrangement, a negative pressure suction groove is composed including the outer circumferential groove 92 and the diametric groove 94.

An air passage 96 as a negative pressure suction bore is opened in one side of the connecting portion of the outer circumferential groove 92 and the diametric groove 94, and communicated the outer circumferential groove 92 and the diametric groove 94. The air passage 96 is formed extending in the axial direction through inner portion of the lower partition member 34 at an outer circumferential portion of the attraction face 90. One end of this air passage 96 is open in the connecting portion of the outer circumferential groove 92 and the diametric groove 94, while the other end of the air passage 96 is communicated with a port 98 opens in the outer circumferential face of the lower partition member 34. The port 98 of a round tubular shape that is formed projecting within a circular recess opening in the outside peripheral face at the axially downward end of the lower partition member 34.

In this embodiment, an opening dimension of the air passage 96 at the attraction face 90 side is made larger than the groove width dimension of the diametric groove 94. At the portion of the diametric groove 94 near the air passage 96, there is formed an enlarge width portion 100 in which the groove width dimension is gradually increased toward the air passage 96 so that the enlarged width portion 100 has a triangular shape overall in the top plane view. The diametric groove 94 includes a slope portion 101 wherein the groove depth dimension increases as it goes toward the air passage 96, and is connected with the air passage 96 with the generally same depth dimension as the air passage 96.

Figure 8:
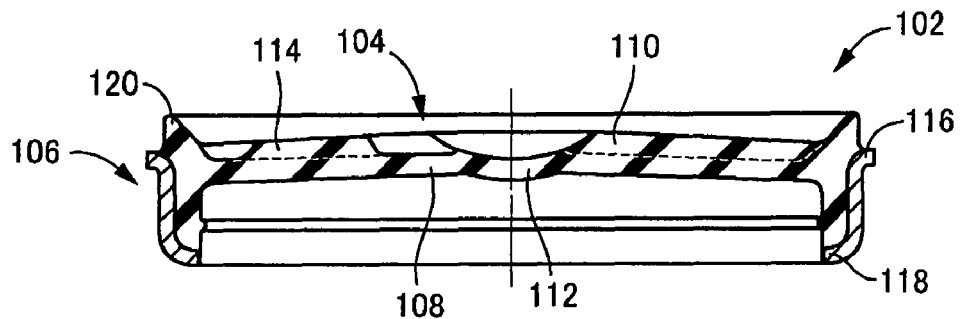
FIG. 8 is an elevational view in axial or vertical cross section of a pressure adjustment member of the partition member, which is taken along line 8-8 of FIG. 9.
Figure 9:
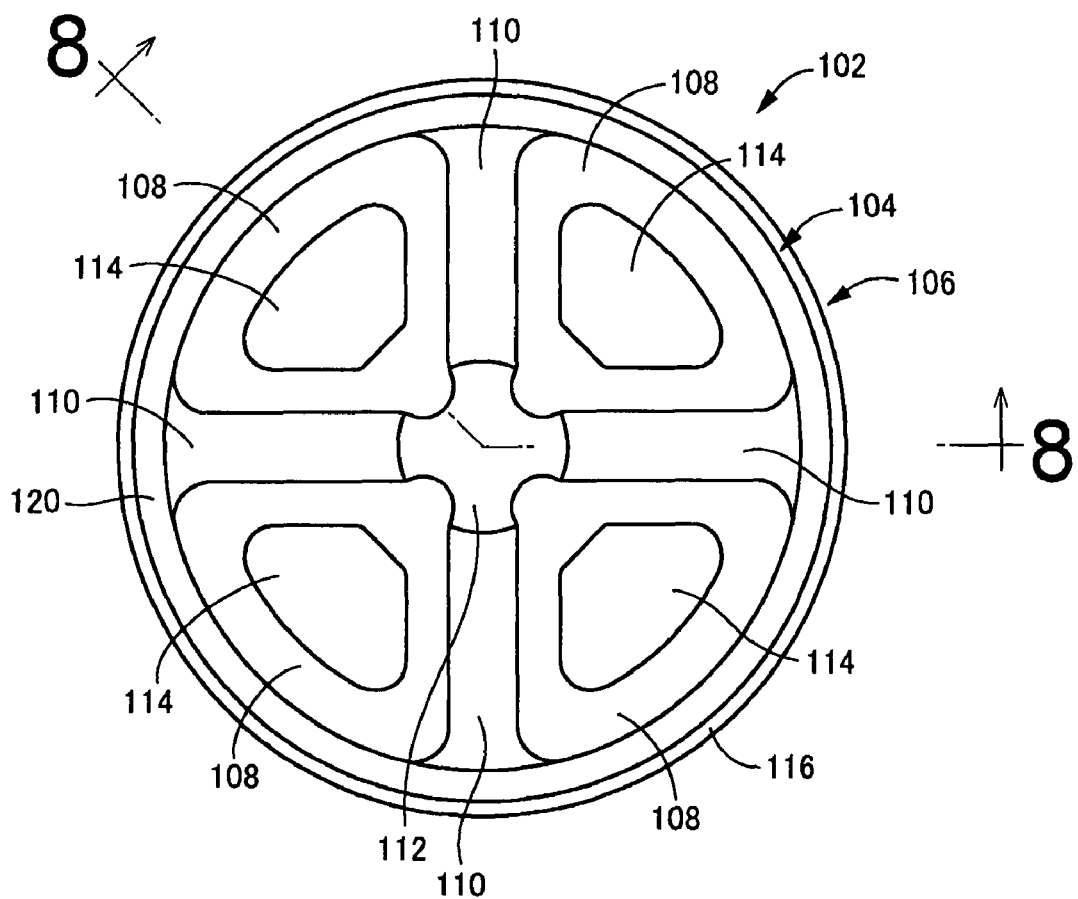
FIG. 9 is a top plane view of the pressure adjustment member of FIG. 1.

Above the lower partition member 34, there is formed a pressure adjustment member 102 so as to cover the center projection 70. As shown in FIGS. 8 and 9, the pressure adjustment member 102 is constituted by a movable rubber film 104 as a rubber elastic film and a fitting ring 106 being vulcanization bonded to an outer circumferential edge of the movable rubber film 104.

The movable rubber film 104 is of a generally disk shape and a taper shape positioning slightly and gradually axial upward toward a radially center side. In the movable rubber film 104, there is formed a flexible rubber film portion 108 as a thin walled portion. The flexible rubber film portion 108 is a thin circular rubber film whose outer circumferential edge is fitted to an inner circumferential face of the generally disk shaped fitting ring 106.

In two diametric directions of the movable rubber film 104, which are orthogonal to each other, two reinforcing ribs 110 are integrally formed with the flexible rubber film portion 108 in each diametric directions so that totally four reinforcing ribs 110 are formed. The reinforcing rib 110 is of a sufficient thick shape comparing to the flexible rubber film portion 108 and extends from the radially outer circumferential edge of the movable rubber film 104 toward radially inward direction with a length which does not reach the radial center. In other wards, in one diametric direction, two reinforcing ribs 110 are positioned apart mutually at either side of a center portion. The reinforcing rib 110 is slant along with a taper face of the movable rubber film 104 which is of a taper shape, so that it get inclined in the longitudinal direction or radial direction. In this embodiment particularly, the reinforcing rib 110 is tilt with the radial center side thereof raised toward the axially upward direction and upper and lower faces of the reinforcing rib 110 is tilt with the approximately same angle. Moreover, in this embodiment, the reinforcing rib 110 is tilt with a generally unchanging angle and extended linearly with a generally unchanging cross section over an entire length.

While being surrounded by radially inner distal ends of the reinforcing ribs 110 the flexible rubber film portion 108 is disposed at a radially center portion of the movable rubber film 104 so as to serve as a center rubber film portion 112. The center rubber film portion 112 is concaved so as to project in the axial downward direction. The reinforcing ribs 110, which is separated in the radial center portion, are mutually connected each other by the center rubber film portion 112.

The flexible rubber film portion 108, which is formed between circumferentially adjacent ones of the reinforcing ribs 110 with a generally fan shape, is formed with a suction suppression member 114 at a generally center portion thereof in order to provide a center thick portion that is made sufficiently thick comparing to the flexible rubber film portion 108. The suction suppression member 114 is formed being separate from all of the reinforcing ribs 110, the peripheral edge of the movable rubber film 104 and the center rubber film portion 112. In other words, the suction suppression member 114 is surrounded by the flexible rubber film portion 108 over the entire circumference thereof. Specially in this embodiment, by forming the suction suppression member 114 in a general center of the flexible rubber film portion 108, the flexible rubber film portion 108 is formed in a groove shaped area where the flexible rubber film portion 108 extends while surrounding periphery of the suction suppression member 114.

At the outer circumferential end of the movable rubber film 104 described above, the inner face of the fitting ring 106 is formed. The fitting ring 106 has a thin, generally round tubular shape and is formed of a metal material such as iron, aluminum alloy, or the like. At the one axial end (upper end in this embodiment) of the fitting ring 106 is integrally formed a flange portion 116 flaring diametrically outward around the entire circumference, while at the other axial end (lower end in this embodiment) of the fitting ring 106 is integrally formed an engaging projection 118 extending diametrically inward around the entire circumference.

On the axial upper end of the fitting ring 106, as shown in FIG. 8, there is formed a seal lip 120 projecting axially upwardly. The seal lip 120 is integrally formed with the movable rubber film 104, being formed continuous all the way around in the circumferential direction with substantially unchanging mountain cross section.

In the pressure adjustment member 102 of structure described above, an axial lower end portion of the fitting ring 106 fits externally onto the center projection 70 of the lower partition member 34. Also, by operating a diameter constricting operation such as 360 degree drawing operation from the axial medial portion of the fitting ring 106 against the lower portion thereof, the engaging projection 118 is fastened locking into the fitting groove 72 of the center projection 70. With this arrangement, an upper opening portion of the center projection 70 is covered by the movable rubber film 104, an entire surface of the attraction face 90 is opposed the movable rubber film 104, and there is formed a working air chamber 122 as a pressure operating chamber between the attraction face 90, which is a bottom portion of the center projection 70, and the movable rubber film 104.

In addition, the lower partition member 34 is superimposed on the bottom face of the upper partition member 32, thereby the fitting ring 106 is fitted and inserted in the central recess 36 of the upper partition member 32. And the flange portion 116 of the fitting ring 106 presses the seal lip 120 against the step portion 38 of the central recess 36. In this arrangement, by means of the seal lip 120, space between the fitting ring 106 and the upper partition member 32 is sealed off fluid-tightly over an entire circumferential in the axial direction.

With the upper partition member 32 and the lower partition member 34 superposed against each other in the axial direction, the mating projections 62, 62, 62 formed in the upper partition member 32 are inserted into the engaging holes 80, 80, 80 formed in the lower partition member 34 respectively, and the upper partition member 32 and the lower partition member 34 are turned relative to each other about the center axis. Accordingly, each mating projection 62 is locked in place within the corresponding engaging hole 80 furnished with the projecting wall portion 82. With this arrangement, the upper partition member 32 and the lower partition member 34 are held superposed in the axial direction, and the seal lip 120 undergoing compressive deformation in the axial direction between the flange portion 116 and the step portion 38 holds its state. Specifically, the elastic force of the seal lip 120 exerts frictional power sufficient to hold the locked state of the upper partition member 32 and the lower partition member 34.

The partition member 30 is constituted including the upper and lower partition members 32, 34 which are superposed in the axial direction. And the partition member 30 is inserted in the side of the small-diameter tube portion 24 of the second mounting member 14 (the lower end in FIG. 1). The lower end face of an internal flange-shaped mating projection 124 formed at the lower end of the second mounting member 14 is superposed against the upper face of the outer circumferential portion of the lower partition member 34, whereby the upper and lower partition members 32, 34 are positioned in the axial direction with respect to the second mounting member 14. In the lower partition member 34, only a portion above the center projection 70 is fitted into the second mounting member 14. A recess, where the port 98 is formed, is projecting axially outward from the second mounting member 14 and being exposed to outside space.

The small-diameter tube portion 24 of the second mounting member 14 is subjected to the diameter constricting operation such as 360 degree drawing, whereby the outer circumferential faces of the upper and lower partition members 32, 34 are superposed fluid-tightly against the inside peripheral face of the small-diameter tube portion 24 via the seal rubber layer 28 formed on the inside peripheral face of the small-diameter tube portion 24, and the mating projection 124 is fastened mating and locking into the upper mating groove 76 of the lower partition member 34. With this arrangement, the partition member 30 is fastened mating with the second mounting member 14.

A diaphragm 126 serving as a flexible film is attached to the lower end of the second mounting member 14 exposing from the second mounting member 14. The diaphragm 126 is constituted as a thin rubber elastic film of generally disk shape whose center portion has enough slack to allow it to deform readily.

A fastening fitting 128 having the form of a large-diameter circular tube is vulcanization bonded to the outer circumferential edge (in this embodiment, outer circumferential face) of the diaphragm 126. A mating projection 130 extending radially inward all the way around in the circumferential direction and in an internal flange-shape is integrally formed at the upper opening end of the fastening fitting 128. The inside peripheral face of the fastening fitting 128 is covered by a thin seal rubber layer integrally formed with the diaphragm 126, and the diaphragm 126 is projecting from the fastening fitting 128 toward downward.

This fastening fitting 128 is fitted externally onto the lower partition member 34, from the axially downward direction, and the fastening fitting 128 is subjected to a diameter constricting operation. With this arrangement, the upper inner circumferential face of the fastening fitting 128 is fitted mating externally on the outer peripheral face of the end of the lower partition member 34 at the other axial side (on the lower side in FIG. 1) projecting axially outwardly via the seal rubber layer. By means of this arrangement, the mating projection 130 of the fastening fitting 128 is fitted and fastened locking into the lower mating groove 78 of the lower partition member 34.

By means of this arrangement, an opening of the lower recess 68 of the lower partition member 34 is sealed off fluid-tightly by the diaphragm 126 and the other opening side of the second mounting member 14 (on the lower side in FIG. 1) is sealed off fluid-tightly by the diaphragm 126. The partition member 30 is positioned between the faces of the main rubber elastic body 16 and the diaphragm 126 in opposition in the axial direction (vertical direction in FIG. 1).

Between the superposed faces of the main rubber elastic body 16 and the diaphragm 126 sealed off from the outside space is formed a fluid chamber 132 in which a noncompressible fluid is sealed. As the sealed fluid, it is possible to use water, an alkylene glycol, a polyalkylene glycol, silicone oil or the like. In order to effectively attain vibration damping action based on flow behavior such as resonance behavior of the fluid, a low-viscosity fluid having viscosity of 0.1 Pa·s or lower is preferred. Sealing of the non-compressible fluid within the fluid chamber 132 is advantageously accomplished, for example, by carrying out the process of assembling the partition member 30 and the diaphragm 126 with the integrally vulcanization molded component of the main rubber elastic body 16 incorporating the first and second mounting members 12, 14, while these are immersed in the non-compressible fluid.

Within the interior of the fluid chamber 132, the partition member 30 is arranged so as to extend in the axis-perpendicular direction, thereby dividing the chamber into two parts. To one side of this partition member 30 in the axial direction (the upper side in FIG. 1) there is formed a pressure-receiving chamber 134 a portion of whose wall is constituted by the main rubber elastic body 16, and which gives rise to pressure fluctuations on the basis of elastic deformation of the main rubber elastic body 16 when vibration is input across the first mounting member 12 and the second mounting member 14. To the other side of this partition member 30 in the axial direction (the lower side in FIG. 1), there is formed an equilibrium fluid chamber 136 whose wall is partially constituted by the diaphragm 126 and that readily permits change in volume on the basis of elastic deformation of the diaphragm 126.

Between the upper partition member 32 and the movable rubber film 104, an internal space is formed by means of an opening of the central recess 36 of the upper partition member 32 being covered by the movable rubber film 104. This internal space is regarded an intermediate chamber 138. With this arrangement, in the partition member 30, the intermediate chamber 138 is formed at the upper side of the movable rubber film 104 and a working air chamber 122 is formed at the lower side of the movable rubber film 104.

As described above, in the engine mount 10 of this embodiment, the equilibrium fluid chamber 136 is formed in the opposite side of pressure-receiving chamber 134 with the intermediate chamber 138 interposed therebetween, and the working air chamber 122 is formed between the intermediate chamber 138 and the equilibrium fluid chamber 136. Like the pressure-receiving chamber 134 and the equilibrium fluid chamber 136, non-compressible fluid is sealed in the intermediate chamber 138. In this embodiment, a primary fluid chamber is formed including the pressure-receiving chamber 134 and the intermediate chamber 138, and a part of wall of the primary fluid chamber is constituted of the main rubber elastic body 16. Also, an auxiliary fluid chamber is formed by the equilibrium fluid chamber 136, and a part of wall of the auxiliary fluid chamber flexible is constituted of the flexible film. Since a part of wall of the intermediate chamber 138 is constituted of the movable rubber film 104, the part of the wall of the primary fluid chamber is constituted of the movable rubber film 104. In this embodiment, a first partition component is constituted by the lower partition member 34 which is interposed between the primary fluid chamber and the auxiliary fluid chamber. A second partition component is constituted including the upper partition member 32 which is interposed between the pressure-receiving chamber 134 and the intermediate chamber 138 constitute the primary fluid chamber.

As noted, the constrained installation zone 52 is formed on the upper base of the partition member 30 consisting of the septum portion dividing the pressure-receiving chamber 134 from the intermediate chamber 138, and the movable plate 56 is positioned housed within the constrained installation zone 52 displaceably at a prescribed amount in its thickness direction (the vertical direction in FIG. 1). As described above, in this embodiment, the constrained installation zone 52 divides the pressure-receiving chamber 134 and the intermediate chamber 138. Described more specifically, the second partition component dividing the pressure-receiving chamber 134 and the intermediate chamber 138 is made including the cover member 50 and the movable plate 56 which constitute the constrained installation zone 52, in addition to the upper partition member 32. The upper and lower faces of this movable plate 56 are subjected to the pressure-receiving chamber 134 and the intermediate chamber 138 respectively through each plurality of through holes 54. When vibration is input, pressure fluctuations of the pressure-receiving chamber 134 escape to the intermediate chamber 138 on the basis of fluctuations of the relative pressure difference between the pressure-receiving chamber 134 and the intermediate chamber 138. The extent of displacement of the movable plate 56 and hence the amplitude of pressure fluctuations escaping from the pressure-receiving chamber 134 to the intermediate chamber 138 are limited on the basis of limiting the extent of displacement of the movable plate 56 as the movable plate 56 strikes against the upper partition member 32 or the cover member 50. As will be apparent from the preceding description, in this embodiment, a fluid flow level limiting member for limiting fluid flow level through the fluid flow passage consisting of the constrained installation zone 52 and the plurality of through holes 54 is composed including the movable plate 56.

The circumferential groove 40 of the upper partition member 32 is covered fluid-tightly by the small-diameter tube portion 24, with the seal rubber layer 28 formed on the inside peripheral face of the small-diameter tube portion 24 of the second mounting member 14 sandwiched between them, thereby forming a first orifice passage 140. One end of the first orifice passage 140 connects to the pressure-receiving chamber 134 via the communication window 42 of the upper partition member 32. The other end of the first orifice passage 140 connects to the equilibrium fluid chamber 136 via the communication hole 44 of the upper partition member 32 and the through hole 74 of the lower partition member 34. The cover member 50 is superposed on the upper partition member 32, thereby the first orifice passage 140 connects to the pressure-receiving chamber 134 via a penetration perforating a portion of the cover member 50 which superposes communication window 42. With this arrangement, the pressure-receiving chamber 134 and the equilibrium fluid chamber 136 are connected to one another through the first orifice passage 140, permitting fluid flow between the two chambers 134, 136 via the first orifice passage 140.

The communication passage 46 that connects in proximity to the other end of the circumferential groove 40 of the upper partition member 32, together with the circumferential groove 40, is covered fluid-tightly by the small-diameter tube portion 24 of the second mounting member 14. The circumferential groove 40 and the communication passage 46 cooperate to form a second orifice passage 142. One end of the second orifice passage 142 connects to the intermediate chamber 138 via the communication passage 46, while the other end of the second orifice passage 142 connects to the equilibrium fluid chamber 136 via the communication hole 44 of the upper partition member 32 and the through hole 74 of the lower partition member 34. Thereby, the intermediate chamber 138 and the equilibrium fluid chamber 136 communicate with one another through the second orifice passage 142, permitting fluid flow between the two chambers 138, 136 through the second orifice passage 142.

Figure 10:
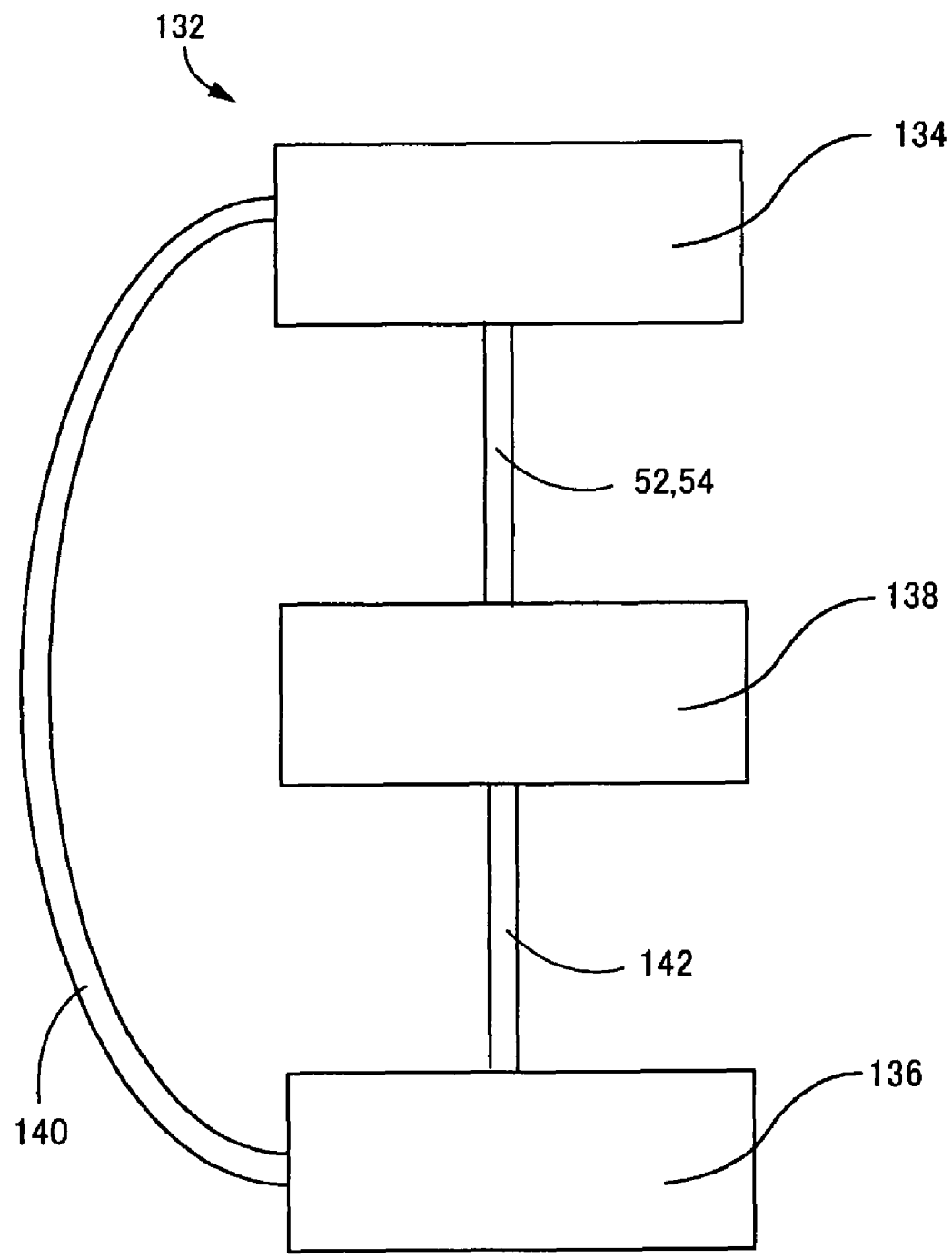
FIG. 10 is a view of a schematic model suitable for explaining a construction of a fluid chamber of the engine mount of FIG. 1.

As will be apparent from the preceding description, in this mode, the first orifice passage 140 and the second orifice passage 142 are formed by means of cooperation of the upper partition member 32 and the lower partition member 34. In this embodiment, since the communication passage 46 connects to part of the circumferential groove 40, the second orifice passage 142 is formed in cooperation with part of the first orifice passage 140. However, since the passage lengths of the first orifice passage 140 and the second orifice passage 142 are originally quite different from each other, the two passages are individually tuned to an appropriate frequency band described later. Specifically, in the engine mount 10 pertaining to this embodiment, as schematically shown in FIG. 10, the fluid chamber 132 in which a non-compressible fluid is sealed includes the pressure-receiving chamber 134, the equilibrium fluid chamber 136, and the intermediate chamber 138. The pressure-receiving chamber 134 and the intermediate chamber 138 communicate with each other through the fluid flow passage consisting of the constrained installation zone 52 and the plurality of through holes 54. The pressure-receiving chamber 134 and the equilibrium fluid chamber 136 communicate with each other through the first orifice passage 140. The intermediate chamber 138 and the equilibrium fluid chamber 136 communicate with each other through the second orifice passage 142.

In this mode in particular, the resonance frequency of fluid caused to flow through the first orifice passage 140 is tuned so as to produce effective vibration damping action (high damping action) against vibration in a low frequency band of around 10 Hz, corresponding to engine shake, on the basis of the resonance behavior of the fluid. The resonance frequency of fluid caused to flow through the second orifice passage 142 is tuned to a medium frequency band of around 20-40 Hz, corresponding to idling vibration, on the basis of the resonance behavior of the fluid. With this arrangement, the second orifice passage 142 is tuned to a higher frequency band than the first orifice passage 140, and when vibration in the medium frequency band is input, effective vibration damping action (vibration isolating action through low spring) thereof is produced on the basis of the resonance behavior of the fluid caused to flow through the second orifice passage 142. Tuning of the first and second orifice passages 140, 142 can be accomplished, for example, through adjustment of passage length and passage cross sectional area of each orifice 140, 142 while giving consideration to characteristic values based on the spring rigidity of the walls of the pressure-receiving chamber 134, the equilibrium fluid chamber 136, and the intermediate chamber 138, i.e. levels of elastic deformation of the diaphragm 126, movable plate 56, movable rubber film 104 or main rubber elastic body 16 corresponding to the level of pressure change needed to produce a given change in unit volume of these fluid chambers. Typically, the frequency at which the phase of pressure vibration transmitted through the orifice passages 140, 142 changes to assume an approximately resonant state can be understood to be the tuning frequency of the orifice passages 140, 142.

In the engine mount 10 having the structure described above, using a fastening bolt (not shown), the nut portion 18 of the first mounting member 12 is fastened screwed to a mounting member on the power unit side, and the large-diameter tube portion 22 of the second mounting member 14 is affixed to an outer bracket (not shown), with the outer bracket fastened with a bolt or the like to a mounting member on the car body side. With this arrangement, the engine mount 10 is installed between the power unit and the car body, with the power unit supported in vibration damped fashion on the vehicle body.

In this installed state, an air conduit 144 is connected to the port 98 of the air passage 96 formed in the partition member 30, and the working air chamber 122 is connected to a switch valve 146 through this air conduit 144. The switch valve 146 is composed of an electromagnetic valve or the like, and selectively switches the working air chamber 122 between communication with the outside atmosphere and with a prescribed negative pressure source. The switch valve 146 is also connected to a control unit, not shown. In the control unit, required items of information are input from among information indicating status of the vehicle, such as car speed, engine rpm, reduction gear select position, throttle opening, and so on supplied by various sensors furnished on the car. On the basis of this information, switching operation of the switch valve 146 is carried out in accordance with a pre-established program, by means of microcomputer software or the like. Through appropriate switching control of the switch valve 146 depending on vibration input under various conditions such as the driving conditions of the car, pressure control of the working air chamber 122 is carried out for the purpose of achieving the intended vibration damping action.

Here, specific modes of operation in the engine mount 10 shall be described. Vibration damping action against vibration shall be described hereinbelow in consideration of three types of vibration, namely, (1) engine shake, which represents low frequency, large amplitude vibration; (2) driving booming noise, which represents high frequency, small amplitude vibration; and (3) idling vibration which represents medium frequency, medium amplitude vibration.

(1) Vibration Damping Action Against Engine Shake

When low frequency, large amplitude vibration such as engine shake is input, pressure fluctuations of very high amplitude are produced in the pressure-receiving chamber 134. The movable distance of the movable plate 56 has been established such that pressure fluctuations in the pressure-receiving chamber 134 are difficult to absorb through displacement of the movable plate 56 within its permitted movable distance range. With this arrangement, the pressure absorbing action of the movable plate 56 is substantially nonfunctional.

That is, during input of low frequency, large amplitude vibration, the movable plate 56 and the intermediate chamber 138 are substantially nonfunctional. Thus, a level of fluid flow through the first orifice passage 140 is effectively assured by means of relative pressure fluctuations produced between the pressure-receiving chamber 134 and the equilibrium fluid chamber 136 when such vibration is input, and effective vibration damping action (high attenuating action) against engine shake is attained on the basis of the resonance behavior of the fluid caused to flow through the first orifice passage 140.

(2) Vibration Damping Action Against Driving Booming Noise

When driving booming noise or other such high frequency, small amplitude vibration is input, pressure fluctuations of small amplitude are produced in the pressure-receiving chamber 134. During such pressure fluctuations, the movable plate 56 effectively undergoes displacement, while the working air chamber 122 is allowed to bleed to the atmosphere and the movable rubber film 104 is allowed to undergo elastic deformation. By means of displacement of the movable plate 56 within its movable distance range, the pressure fluctuations of the pressure-receiving chamber 134 are efficiently transmitted to the intermediate chamber 138, so that in the intermediate chamber 138, liquid pressure suction action based on elastic deformation of the movable rubber film 104 is achieved. That is, when high frequency, small amplitude vibration is input, the liquid pressure suction function produced through cooperative action on the part of the movable plate 56, the intermediate chamber 138, and the movable rubber film 104 becomes operational, and pressure fluctuations in the pressure-receiving chamber 134 are absorbed by the intermediate chamber 138, thus avoiding markedly highly dynamic spring by the engine mount 10.

During input of high frequency, small amplitude vibration, the first orifice passage 140 and the second orifice passage 142, which are tuned to lower frequency bands, experience a marked rise in fluid flow resistance due to anti-resonance behavior, becoming substantially blocked off.

That is, while in this state, the pressure-receiving chamber 134 and the intermediate chamber 138 into which the pressure of the former has escaped each assume a cut-off state independent from the equilibrium fluid chamber 136, the movable rubber film 104 which constitutes part of the wall of the intermediate chamber 138 is permitted to undergo elastic deformation relatively easily, due to the working air chamber 122 formed behind it being open to the atmosphere. In particular, the movable rubber film 104 has been given spring properties soft enough to sufficiently absorb elastic deformation produced by pressure fluctuations in the intermediate chamber 138 on the order of those created during input of high frequency, small amplitude vibration such as drive booming noise. Consequently, development of markedly highly dynamic spring due to substantial closing off of the first and second orifice passages 140, 142 is avoided, and good vibration damping action (vibration isolating action through low spring properties) against high frequency, small amplitude vibration is attained.

(3) Vibration Damping Action Against Idling Vibration

When idling vibration or other such medium frequency, medium amplitude vibration is input, pressure fluctuations of a certain amplitude are produced in the pressure-receiving chamber 134. During these pressure fluctuations the movable plate 56 undergoes displacement, and by means of displacement of the movable plate 56 within its movable distance range, the pressure fluctuations of the pressure-receiving chamber 134 are transmitted to the intermediate chamber 138. During input of medium frequency, medium amplitude vibration, the first orifice passage 140, which are tuned to a lower frequency band, experiences a marked rise in fluid flow resistance due to anti-resonance behavior, becoming substantially blocked off.

On the other hand, negative pressure is introduced into the working air chamber 122, so that the movable rubber film 104 is constrained and suctioned into the side of the attraction face 90. In the movable rubber film 104 having a structure according to this embodiment, when negative pressure is applied against the working air chamber 122 and suction force acts against the movable rubber film 104, firstly, the flexible rubber film portion 108 and the center rubber film portion 112, which are thin elastic films, undergo elastic deformation easily and are suctioned by negative pressure. At this time, since the suction suppression member 114, which is formed in a generally center of the flexible rubber film portion 108 and is surrounded by the flexible rubber film portion 108, has a thickness larger than that of the flexible rubber film portion 108, the suction suppression member 114 is less likely to undergoes elastic deformation comparing to the flexible rubber film portion 108. Thus, during the negative suction, the suction suppression member 114 hardly undergoes elastic deformation, and undergoes displacement in the axis direction by means of elastic deformation of the flexible rubber film portion 108 which surrounds the periphery thereof. By means of forming the suction suppression member 114 which is relatively difficult to undergo elastic deformation in the generally center portion of the flexible rubber film portion 108, it is possible to prevent the flexible rubber film portion 108 from being applied more suction than necessary toward an opening portion of the air passage 96 at the working air chamber 122 side. As to the center rubber film portion 112, a plurality of spots (four spots in this embodiment) in the outer circumferential portion thereof is connected with ends of the reinforcing ribs 110 in the radially center side, which have similar thickness to the suction suppression member 114. With this arrangement, the reinforcing rib 110 being relatively difficult to undergo elastic deformation supports the center rubber film portion 112, which is formed by the elastic film having similar thinness to the flexible rubber film portion 108. Thus, it is possible to prevent the movable rubber film 104 from more elastic deformation than necessary and as a result, being suctioned into the opening portion of the air passage 96 at the working air chamber 122 side.

When the flexible rubber film portion 108 and the center rubber film portion 112 undergo elastic deformation in allowably limited amount, next the reinforcing rib 110, which is relatively thick, undergoes elastic deformation. That is, the reinforcing rib 110 is having a shape of a cantilever being spaced apart from each other in the radial center portion, thereby the radial center side thereof is made relatively and easily undergoes elastic displacement, and undergoes curved deformation by negative suction. In addition, since the center rubber film portion 112 is of a curved shape projecting to the side of the attraction face 90, when the center rubber film portion 112 is suctioned into the side of the attraction face 90, the radial center side of the reinforcing rib 110 is suctioned into the attraction face 90 following the displacement of the center rubber film portion 112 to the side of the attraction face 90. Thus, elastic deformation of the reinforcing rib 110 is accelerated. The reinforcing rib 110 is suctioned into the side of the attraction face 90 in given amount and undergoes elastic deformation. However, the reinforcing rib 110 could not be deformed easily like the center rubber film portion 112 and flexible rubber film portion 108. By means of rigidity of the reinforcing rib 110, moderate rigidity is provided with the movable rubber film 104.

As described above, by means of aspirating the movable rubber film 104 by negative pressure introduced into the working air chamber 122, the movable rubber film 104 undergoes deformation to a shape of recess overall and the movable rubber film 104 is absorb along the attraction face 90 which is also of a shape of recess. In this state, the intermediate chamber 138 and the variable-capacity equilibrium fluid chamber 136, in which effective pressure fluctuations are produced in the same manner as in the pressure-receiving chamber 134, are constituted so as to be connected through the second orifice passage 142 which has been tuned to the medium frequency band. Consequently, a level of fluid flow through the second orifice passage 142 is effectively assured by means of relative pressure fluctuations produced between the pressure-receiving chamber 134, intermediate chamber 138, and the equilibrium fluid chamber 136 when vibration is input, and effective vibration damping action (vibration isolating action through low spring properties) against idling vibration is attained on the basis of the resonance behavior of the fluid caused to flow through the second orifice passage 142.

The movable rubber film 104 is of a generally circular dome shape projecting upwardly overall, and is deformed to a shape projecting downwardly during negative suction. As a result, the outer circumferential edge of the movable rubber film 104 undergoes small amount of displacement in the vertical direction comparing to the center portion thereof. Also, in the outer circumferential edge of the movable rubber film 104, there is fitted rigid fitting ring 106 at proximal position, and there is contacted the outer circumferential face of the center projection 70, which gives higher rigidity and makes it difficult to deform readily. Thus, in the outer circumferential edge of the movable rubber film 104, a space between there and the attraction face 90 tends to occur easier than in the center portion thereof. In the area where the space occurs, the movable rubber film 104 is allowed to undergoes free elastic deformation, thereby pressure fluctuation of the pressure-receiving chamber 134 and the intermediate chamber 138 is absorbed by elastic deformation of the movable rubber film 104. Thus, it may be a cause of reducing amount of fluid flow to the second orifice passage 142, interfering vibration damping action.

Figure 11A:
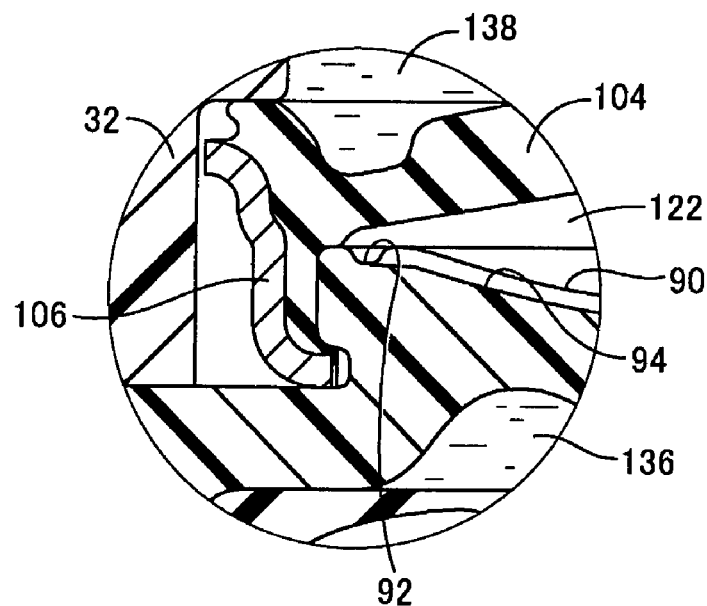
FIG. 11 is an enlarged cross sectional view of a principle part of a rubber elastic film of the engine mount of FIG. 1, which is in a non-suctional state and a suctional state.
Figure 11B:
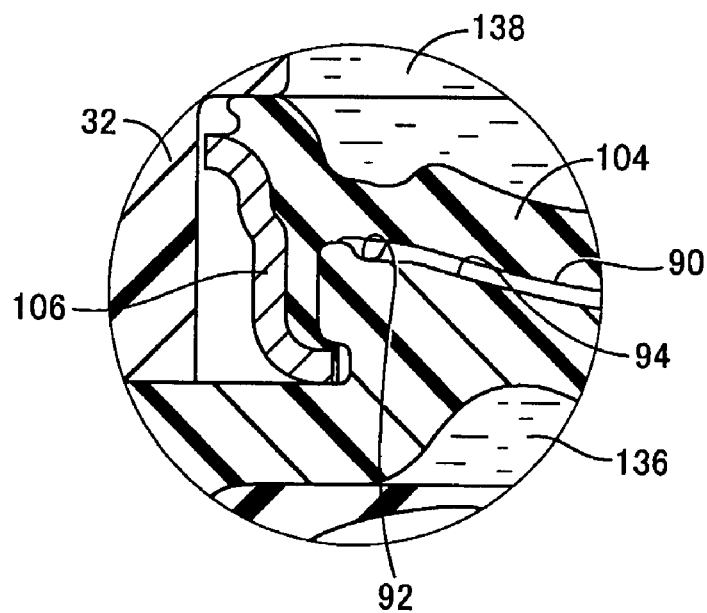

However, in this embodiment, there is formed the outer circumferential groove 92 in the outermost circumferential edge of the attraction face 90. Thus, when the state as shown in FIG. 11A, which the working air chamber 122 is bleed to atmosphere, is change into the state shown FIG. 11B, which the negative suction is introduced into the working air chamber 122, it is possible to apply suction over the entire outer circumferential edge of the movable rubber film 104 by means of the outer circumferential groove 92 so as to suctioned and hold the outer circumferential edge of the movable rubber film 104 on the attraction face 90. This arrangement makes it possible to reduce the area where the gap is formed between the movable rubber film 104 and the attraction face 90 during negative suction, thereby assuring amount of fluid flow more advantageously.

Moreover, by means of forming the diametric groove 94 in addition to the outer circumferential groove 92, it is possible to apply suction in the center portion of the movable rubber film 104 so as to hold the movable rubber film 104 on the attraction face 90 more stably.

Further, in this embodiment, the air passage 96 is opened in a portion connecting the outer circumferential groove 92 and the diametric groove 94. With this arrangement, it is possible to transfer negative suction to both the outer circumferential groove 92 and the diametric groove 94 stably.

In addition, in a portion of the diametric groove 94 being proximal to the air passage 96, there are formed the enlarged width portion 100 and the slope portion 101. With this arrangement, substantially the opening of the air passage 96 is of a shape which extend smooth toward the working air chamber 122 so as to relief phenomenon where the negative pressure is suddenly applied on the opening of the air passage 96 during negative suction. Thus, the fear that the negative suction is suddenly applied in the opening of the air passage 96, and a portion of the movable rubber film 104 being near the opening of the air passage 96 is firstly suctioned, which closes the opening of the air passage 96 before holding the entire movable rubber film 104, is reduced. Thus, it is possible to suctioned and fit the entire movable rubber film 104 stably.

When the state, which negative suction is applied against the working air chamber 122 and the movable rubber film 104 is constrained, is change into the state, which the working air chamber 122 is bleed to atmosphere and negative pressure is bleed, the flexible rubber film portion 108 and the center rubber film portion 112 are difficult to return to original shapes since they are thin and have little force to restore. However, in this embodiment, the reinforcing rib 110 is relatively thick and has large force to restore, intending to return to the original shape immediately. In the both circumferential sides of the reinforcing rib 110, the flexible rubber film portion 108 is integrally formed, while in the radial center side thereof, the center rubber film portion 112 is formed. Thus, by means of the immediate restoring of the reinforcing rib 110 to the original shape, the flexible rubber film portion 108 and the center rubber film portion 112 can immediately return to the original shapes so as to realize switching control of the film rigidity of the movable rubber film 104 immediately and securely depending on vibration input frequency.

As described above, in the engine mount 10 of the present embodiment, the movable rubber film 104 is a shape of projecting upwardly and the attraction face 90 is a shape of recess when negative suction is not applied. By this arrangement, when negative suction is applied, the movable rubber film 104 is deformed to be recess and hold along the attraction face 90. Thus, it is possible to assure both suctional and nonsuctional states stably and switch these states securely, assuring to switch damping characteristics stably and securely.

During negative suction of the movable rubber film 104, by exerting negative suction from the outer circumferential groove 92, the outer circumferential edge of the movable rubber film 104, where tends to occur the space tends to occur, can be more aggressively hold on the attraction face 90. This arrangement makes it possible to make a portion, which could freely undergo elastic deformation during negative suction, smaller and assure amount of fluid flow effectively, whereby it is possible to switch damping characteristics stably and improve damping function.

The connecting state of the working air chamber 122 can be set appropriately according to the required vibration damping characteristics, switching between them as appropriate. For example, the working air chamber 122 may be connected to the negative pressure source during driving so as to constrain the movable rubber film 104 at the side of the attraction face 90. With this arrangement, it is possible to prevent the liquid pressure suction function of the pressure-receiving chamber 134 by the movable rubber film 104, thereby suppressing engine shake more securely.

While the present invention has been described in detail in its presently preferred embodiment, for illustrative purpose only, it is to be understood that the invention is by no means limited to the details of the illustrated embodiment, but may be otherwise embodied. It is also to be understood that the present invention may be embodied with various changes, modifications and improvements which may occur to those skilled in the art, without departing from the spirit and scope of the invention.

Figure 12:
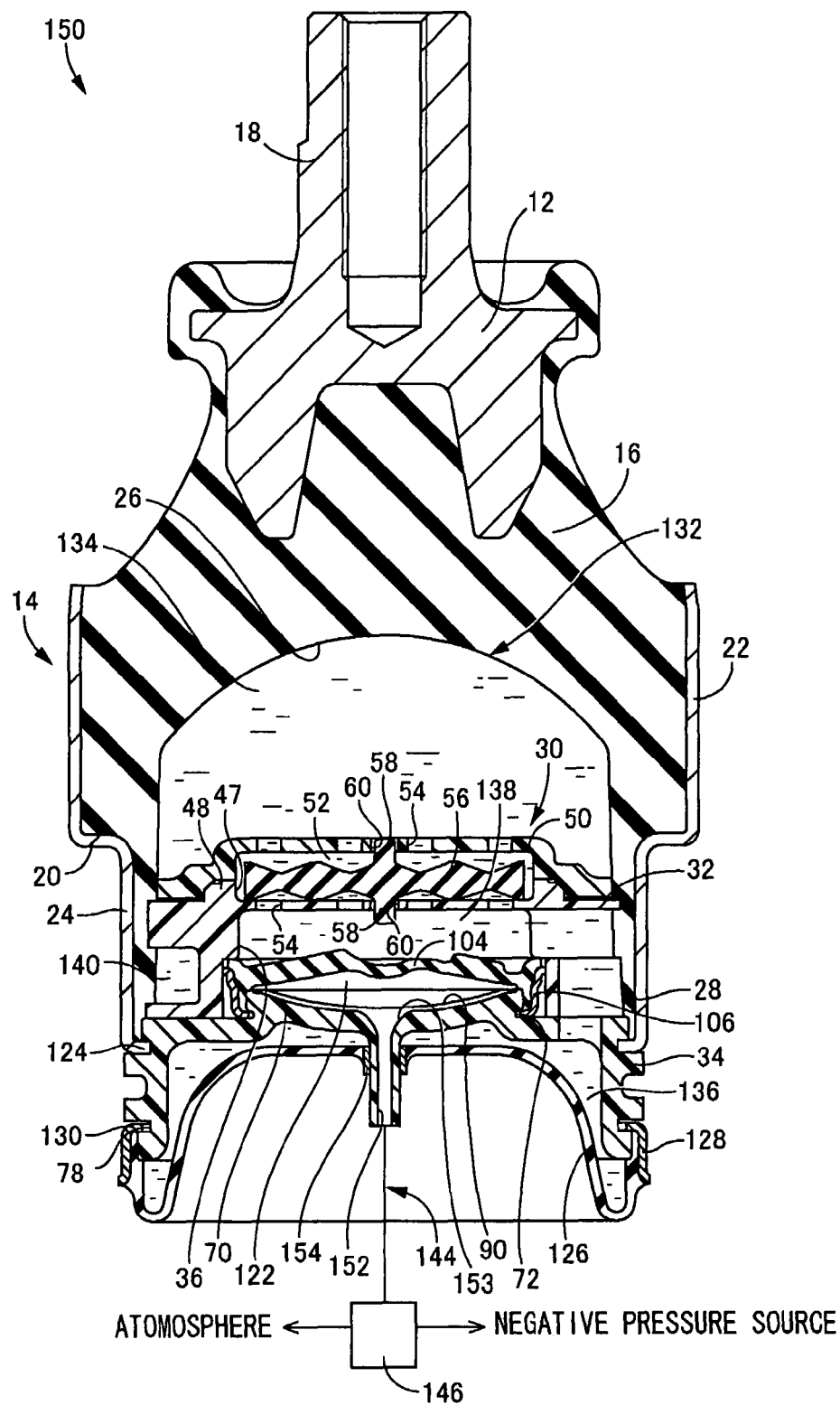
FIG. 12 is an elevational view in axial or vertical cross section of a fluid filled type vibration damping device in the form of an engine mount, which is constructed according to the second embodiment of the invention.

For example, in the illustrated embodiment the air passage 96 as the negative pressure suction bore is formed opening in an outer circumferential portion of the attraction face 90 and extending downwardly in the outer circumferential direction of the lower partition member 34. With this arrangement, it is possible to ensure great bulk of the equilibrium fluid chamber 136 being formed in the lower direction of the lower partition member 34. However, the opening position of the air passage 96 is not limited to a position described in the illustrated embodiment. By way of example, FIG. 12 shows an engine mount 150 as a fluid filled type vibration damping device according to the second embodiment of the invention, whose opening part of the negative pressure suction bore is formed in the different part from that of the illustrated embodiment. In an illustration below, members and parts substantially identical in those in the first mode have been assigned identical symbols to that of the illustrated embodiment, and are not described in detail.

Figure 13:
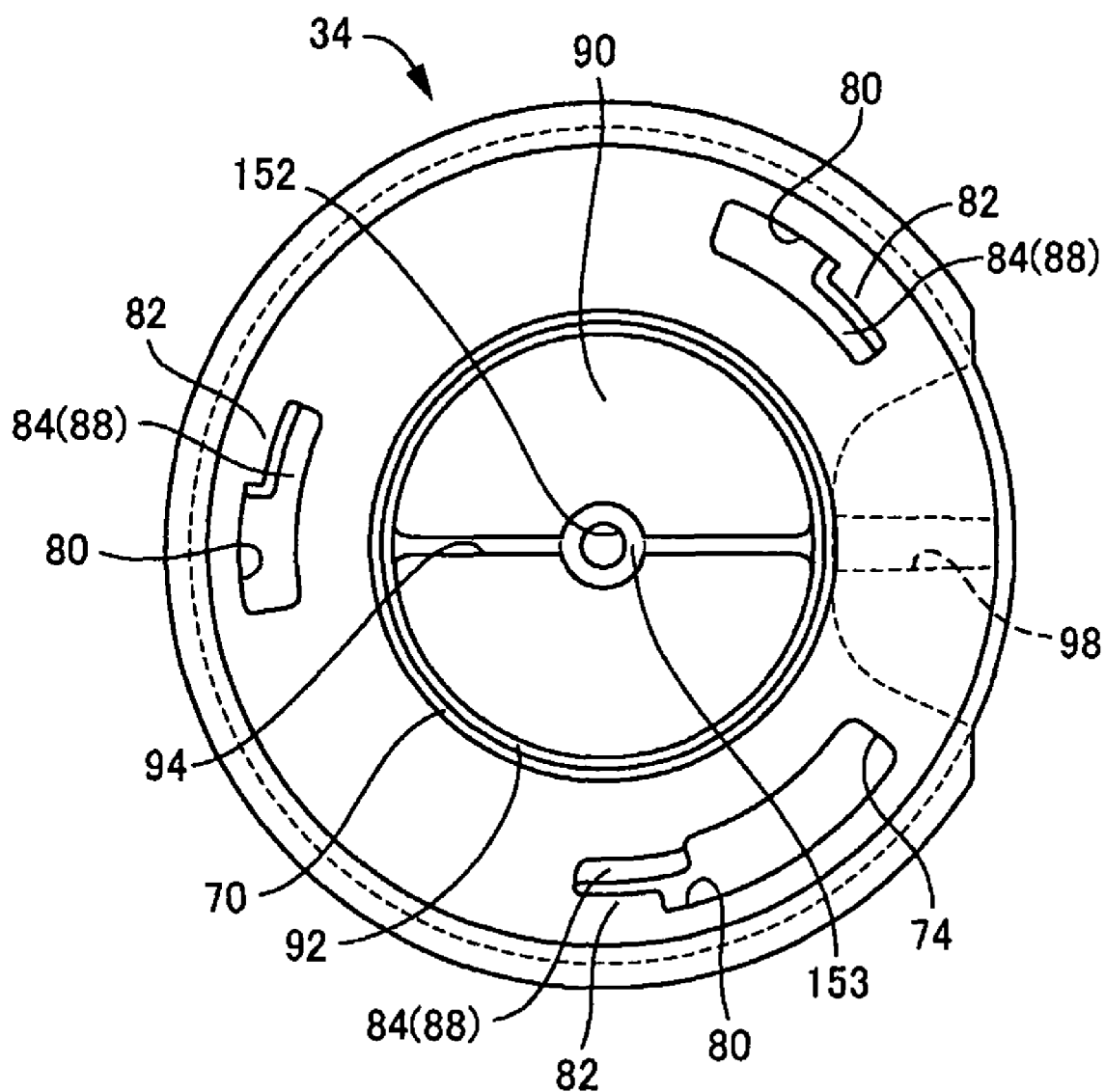
FIG. 13 is a top plane view of the lower partition member 34 of the engine mount of FIG. 12.

The engine mount 150 has a generally same construction as that of the illustrated engine mount 10. Specially, in the engine mount 150, an air passage 152 as the negative pressure suction bore is formed having a generally given circular cross section, and extending in a center portion of the center projection 70 of the lower partition member 34 in the axially downward direction. As shown in FIG. 13, one end portion of the air passage 152 opens in a longitudinal center portion of the diametric groove 94, that is, a center portion of the attraction face 90. A radial dimension of the air passage 152 is made larger than a groove width dimension of the diametric groove 94. In addition, an opening portion of the air passage 152 gradually expands its diameter toward up side over its entire circumference, and connects to the diametric groove 94. With this arrangement, there is formed a slope portion 153 in a portion of the diametric groove 94 connecting to the opening of the air passage 152, whose groove depth dimension gradually becomes deeper toward the air passage 152.

In the center portion of the center projection 70, a generally cylinder shaped air passage 152 is extending in the axially downward direction. While in a generally center portion of the diaphragm 126 of this embodiment, a generally cylinder shape fastening sleeve 154 fits fluid-tightly. The fastening sleeve 154 is fastened externally and fluid-tightly against an outer circumferential face of the air passage 152. By means of this arrangement, the opening of the lower recess 68 of the lower partition member 34 is covered fluid-tightly by the diaphragm 126 and there is formed the equilibrium fluid chamber 136. In addition, a portion of the air passage 152, which is exposed to the outside space from the fastening sleeve 154, is used as a port and connected to the switch valve 146.

In the engine mount 150 with this type of structure, since the air passage 152 is opened in a center of attraction face 90, it is possible to exert negative pressure suction on the center portion of the movable rubber film 104 and to suck the movable rubber film 104 stably.

As will be apparent from this embodiment, the negative pressure suction bore is not necessarily need to open directly on the outer circumferential groove 92. For example, like this embodiment, the air passage 152 could be opened on the diametric groove 94, and the diametric groove 94 could be connected to the outer circumferential groove 92. Thus, negative pressure suction of the air passage 152 is transferred or the like to the outer circumferential groove 92 via the diametric groove 94 or the like. However, in the present invention, the diametric groove 94 is not necessarily needed.

Also, the outer circumferential groove 92 is formed on the outer circumferential portion of the attraction face 90 but not essentially needed to formed on an outermost circumferential portion of the attraction face 90. Moreover, it would be possible to form the outer circumferential groove 92 and the diametric groove 94 with being plurality of strips or the like. By way of example, the plurality of the outer circumferential grooves 92 could be formed coaxially and the plurality of the diametric groove 94 could be formed radially. However, when the negative pressure suction is exerted on the rubber elastic film, in a portion of the rubber elastic film which is superimposed on the outer circumferential groove 92 and the diametric groove 94, to minimize the range which is allowed to deform freely, it is desirable that the number of each of the outer circumferential groove 92 and the diametric groove 94 is one so as to minimize the range which is allowed to deform freely during the negative pressure suction of the rubber elastic film.

Further, the negative pressure suction bore is not always needed to be one. For example, in the foregoing first embodiment, the air passages 96 could be mutually opened in the both ends of the diametric groove 94 or the like. However, like the outer circumferential groove 92 and the diametric groove 94 described above, it is desirable that the number of the negative pressure suction bore is one so as to minimize the range which is allowed to deform freely during the negative pressure suction of the rubber elastic film. The enlarged width portion 100 formed in the outer circumferential groove 92 is not necessarily needed, but for example, could be of a rectangular shape aside from the triangular shape illustrated above.

The outer circumferential groove 92 is not always needed to extend over an entire circumference of the attraction face 90. By means of example, the outer circumferential groove 92 could be uncontinuously formed in the circumferential direction by a plurality of radius shaped recess extending with a radius shape in the outer circumferential portion of the attraction face 90.

In addition, as regards the reinforcing rib 110 formed in the rubber elastic film, the number of the reinforcing is not limited to ones in the preceding embodiments. For instance, in the preceding first embodiment, four reinforcing ribs 110 are formed. However, it is possible to form two, three, five or six reinforcing ribs 110 being spaced equally in the circumferential direction of the movable rubber film 104.

Also, the shape, size, construction, location, number and other aspects of the pressure-receiving chamber 134, the intermediate chamber 138, the equilibrium fluid chamber 136, and the first orifice passage 140 and the second orifice passage 142 communicating them, can be modified appropriately depending on the required vibration damping characteristics and ease of fabrication, and are not limited to those taught hereinabove by way of example. For example, the intermediate chamber 138 and the second orifice passage 142 and so on are not essential elements of the invention. Therefore, it would be possible to constitute a part of wall of the pressure-receiving chamber 134 by the movable rubber film 104 without forming the intermediate chamber 138 and the second orifice passage 142 in the first embodiment described above.

Additionally, in the preceding first and second embodiments, the invention is described as being implemented in an automotive engine mount, the invention could of course be implemented in an automotive body mount or differential mount, or in vibration damping mounts for vibrating objects of various kinds besides automobiles.

What is claimed is:

1. A fluid filled type vibration damping device comprising:
   a first mounting member;
   a second mounting member of tubular shape, the first mounting member being disposed on a side of one opening of the second mounting member;
   a main rubber elastic body elastically connecting the first mounting member and the second mounting member;
   a flexible film by which an other opening of the second mounting member is sealed off fluid-tightly, thereby forming between opposing faces of the main rubber elastic body and the flexible film a fluid chamber in which a non-compressible fluid is sealed;

a partition member supported by the second mounting member, with the fluid chamber divided by the partition member into a primary fluid chamber whose wall is partially defined by the main rubber elastic body and an auxiliary fluid chamber whose wall is partially defined by the flexible film, and with an orifice passage connecting the primary fluid chamber and the auxiliary fluid chamber being formed;

an elastic rubber film being disposed to partially define the primary fluid chamber disposed on one side thereof; and a pressure operating chamber having an attraction face being disposed on an opposite side from the primary fluid chamber with the elastic rubber film interposed therebetween, the pressure operating chamber being arranged to be applied with a negative pressure in order to deform and attract the elastic rubber film onto the attraction face of the pressure operating chamber, wherein:

the elastic rubber film has a dome shape being convex with respect to a primary fluid chamber side, and the attraction face of the pressure operating chamber has an inverted dome shape being concave with respect to the primary fluid chamber side, the attraction face is formed with a plurality of negative pressure suction grooves including an outer circumferential groove extending in a circumferential direction at an outer peripheral portion of the attraction face and opening to the pressure operating chamber, a negative pressure suction bore for introducing the negative pressure to the pressure operating chamber is connected to the plurality of negative pressure suction grooves, the plurality of negative pressure suction grooves include a diametric groove extending continuously in a diametric direction of the attraction face and opening to the pressure operating chamber, while connecting at both ends to the outer circumferential groove, the negative pressure suction bore opens to a connecting portion of the outer circumferential groove and the diametric groove, the diametric groove has a depthwise dimension that gradually increases from a longitudinally intermediate portion thereof toward the negative pressure suction bore, the diametric groove has an enlarged width portion in which a groove width dimension is gradually increased toward the negative pressure suction bore, and the elastic rubber film includes a plurality of thick walled reinforcing ribs each extending radially from an outer peripheral portion of the elastic rubber film with a radial length not enough to reach a central portion of the elastic rubber film, while being disposed so as to be spaced away from one another in the circumferential direction so that thin walled portions of thin rubber elastic body are formed between circumferentially adjacent ones of the reinforcing ribs, and a central curved portion having a wall thickness thinner than the reinforcing ribs, the central curved portion having an inverted dome shape projecting toward the pressure operating chamber, wherein the central curved portion is formed in the central portion of the elastic rubber film, and wherein the central curved portion is surrounded by radially inner ends of the plurality of the reinforcing ribs.

2. The fluid filled type vibration damping device according to claim 1, wherein the negative pressure suction bore is open in a central portion of the diametric groove in a longitudinal direction thereof.

3. The fluid filled type vibration damping device according to claim 1, wherein the partition member includes a first partition component and a second partition component; the primary fluid chamber and the auxiliary fluid chamber are disposed on opposite sides of the first partition component interposed therebetween; the second partition component divides the primary fluid chamber into a pressure receiving chamber whose wall is partially defined by the main rubber elastic body and generates fluid pressure fluctuation upon input of vibration; an intermediate chamber whose wall is partially defined by the elastic rubber film, while the auxiliary fluid chamber functions as an equilibrium chamber whose wall is partially defined by the flexible film to readily permit volumetric change thereof; and the orifice passage includes a first orifice passage connecting the pressure receiving chamber and the equilibrium chamber, and a second orifice passage connecting the intermediate chamber and the equilibrium chamber.

4. The fluid filled type vibration damping device according to claim 3, wherein the second partition component includes a movable member whose displacement or deformation is limited, and one side of the movable member faces the pressure receiving chamber and a second side of the movable member faces the intermediate chamber so that the pressure fluctuation in the pressure receiving chamber is transmitted to the intermediate chamber via the movable member.

5. The fluid filled type vibration damping device according to claim 1, wherein the elastic rubber film includes a thick walled suction suppression member surrounded by the thin walled portion so that a thin walled portion is suctioned first and the thick walled suction suppression member is attracted to the attraction face as a result of suction of the thin walled portion.

* * * * *